United States Patent
Prehofer et al.

(10) Patent No.: US 8,218,511 B2
(45) Date of Patent: Jul. 10, 2012

(54) ACCURATE CONTROL OF TRANSMISSION INFORMATION AD HOC NETWORKS

(75) Inventors: Christian Prehofer, Munich (DE); Philipp Hofmann, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 202 days.

(21) Appl. No.: 10/569,309

(22) PCT Filed: Oct. 24, 2003

(86) PCT No.: PCT/EP03/11820
§ 371 (c)(1),
(2), (4) Date: Feb. 21, 2008

(87) PCT Pub. No.: WO2005/018170
PCT Pub. Date: Feb. 24, 2005

(65) Prior Publication Data
US 2008/0205308 A1 Aug. 28, 2008

(30) Foreign Application Priority Data
Aug. 19, 2003 (EP) .................................... 03018616

(51) Int. Cl.
*H04W 4/00* (2009.01)
*H04L 12/28* (2006.01)
*H04J 3/16* (2006.01)
(52) U.S. Cl. ................ 370/338; 370/401; 370/466
(58) Field of Classification Search .............. 370/355, 370/388, 825.52, 390, 401, 469, 230, 428, 370/328, 466, 338; 455/517, 466; 340/825.52
See application file for complete search history.

(56) References Cited

U.S. PATENT DOCUMENTS 6,282,172 B1 * 8/2001 Robles et al. ............... 370/230
(Continued)

FOREIGN PATENT DOCUMENTS
JP 2003-23420 1/2003

OTHER PUBLICATIONS

Fujiya, et al., "IP Communication Technologies in Mobile Communication Network," The Journal of the Institute of Electronics, Information, and Communication Engineers, 83(4):327-333 (2000).

(Continued)

*Primary Examiner* — Kent Chang
*Assistant Examiner* — Kuo Woo
(74) *Attorney, Agent, or Firm* — Nutter McClennen & Fish LLP; John J. Penny, Jr.; Christina M. Sperry

(57) ABSTRACT

In communication system (SYS) including a first network (IN) with at least a first terminal node (CN), and an ad hoc network (AHN) with at least a second terminal node (RN1-RN4; MN), and a gateway (GW), transmission information (TI) is forwarded between the first terminal node (CN) of the first network (IN) and the second terminal node (RN1-RN4; MN) of the ad hoc network (AHN). In order to perform a more accurate flow control of transmission information (TI) inside the mobile ad hoc network (AHN), the gateway (GW) and the second terminal node (MN) exchange transmission information (TI) as well as acknowledgement information (ACTAN, ACTAN', ACTAN"). Preferably, the exchange of the transmission information (TI) and the acknowledgement information (ACTAN, ACTAN', ACTAN") is carried out through a tunnel link (TUN1) established between the gateway (GW) and the second terminal node (MN).

20 Claims, 12 Drawing Sheets

U.S. PATENT DOCUMENTS

| | | | |
|---|---|---|---|
| 6,496,704 B2 * | 12/2002 | Yuan | 455/466 |
| 6,658,011 B1 * | 12/2003 | Sevanto et al. | 370/401 |
| 6,977,938 B2 * | 12/2005 | Alriksson et al. | 370/401 |
| 7,010,590 B1 * | 3/2006 | Munshi | 709/224 |
| 7,277,416 B1 * | 10/2007 | Chang et al. | 370/338 |
| 2001/0028636 A1 * | 10/2001 | Skog et al. | 370/328 |
| 2002/0036991 A1 * | 3/2002 | Inoue | 370/328 |
| 2002/0049850 A1 * | 4/2002 | Fiori et al. | 709/227 |
| 2002/0138635 A1 | 9/2002 | Redlich et al. | |
| 2002/0186680 A1 * | 12/2002 | Takagi et al. | 370/349 |

OTHER PUBLICATIONS

Bakre, et al., "Implementation and Performance Evaluation of Indirect TCP," IEEE Transactions on Computers, pp. 260-278 (1997).

Chinese Notice of Allowance, Apr. 18, 2011.

Chinese Office Action, Aug. 29, 2008.

Chinese Office Action, Jul. 10, 2009.

* cited by examiner

Fig. 4a

| SA | DAM | TRT ←TIM | TA | CH ←ACC | ←TIS |
|---|---|---|---|---|---|
| SAC | 2MB | 64kbits/s | TA4 | 7ct | |
| SAC | 1MB | 128kbits/s | TAN | 2ct | |
| . | . | . | . | . | |
| . | . | . | . | . | |
| . | . | . | . | . | |

TCH (spans DAM, TRT)

Fig. 4b

| SA | DAM | TRT ←TIM | TA | CH ←ACC | ACK ←ACKM/ACKS4 ACKSN |
|---|---|---|---|---|---|
| SAC | 2MB | 64kbits/s | TA4 | 7ct | ACTA4 |
| SAC | 1MB | 128kbits/s | TAN | 2ct | ACTAN |
| . | . | . | . | . | . |
| . | . | . | . | . | . |
| . | . | . | . | . | . |

←TIS'

TCH (spans DAM, TRT)

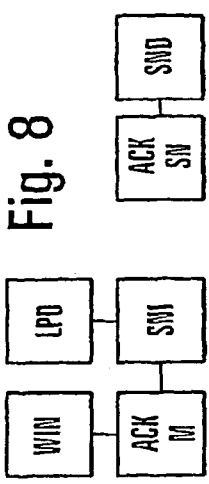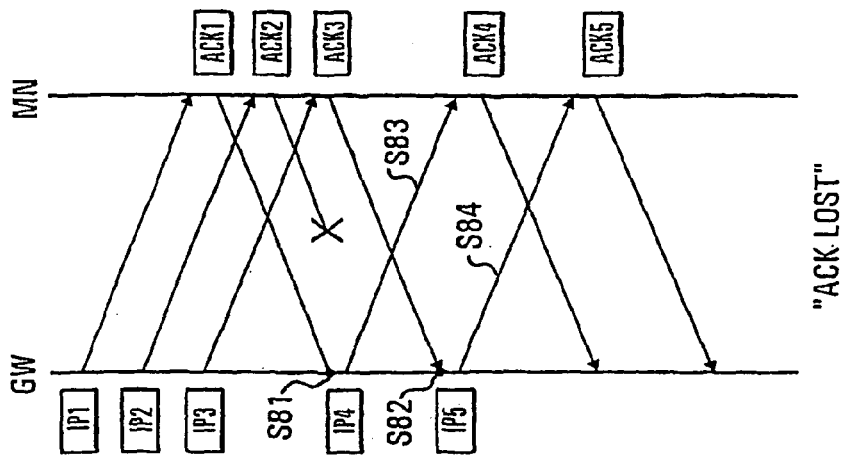
Fig. 7 "SEQUENCE NUMBERS INSERT"
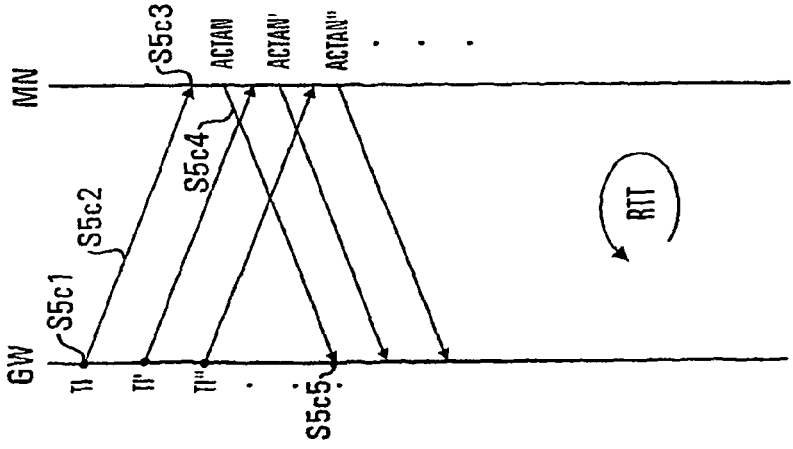
Fig. 8 "ACK LOST"
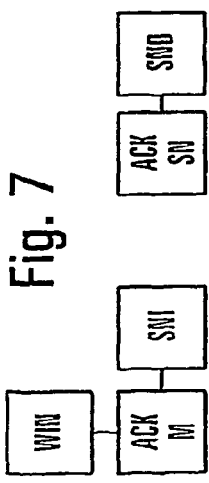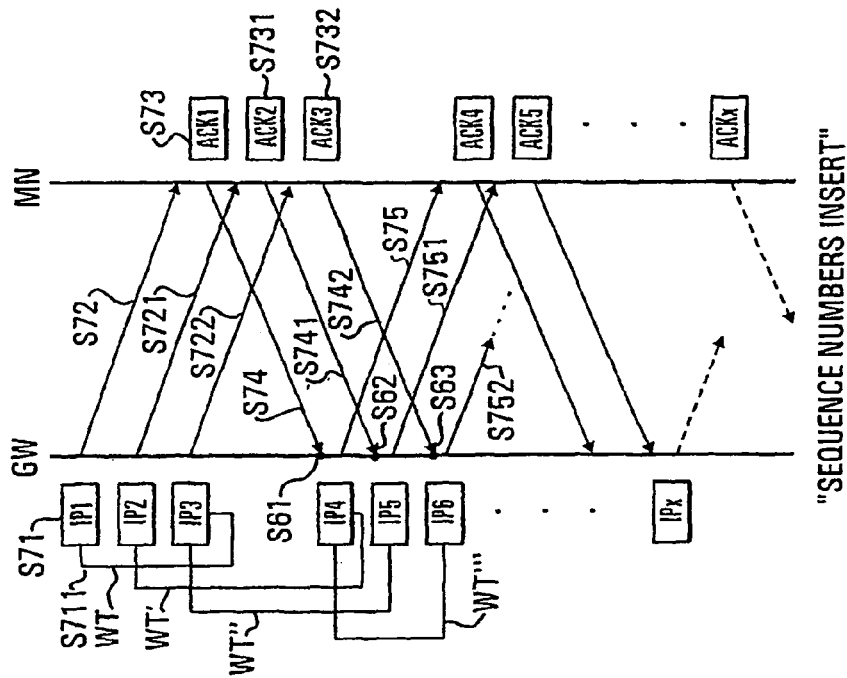
Fig. 5c "ACK TRANSMISSION"

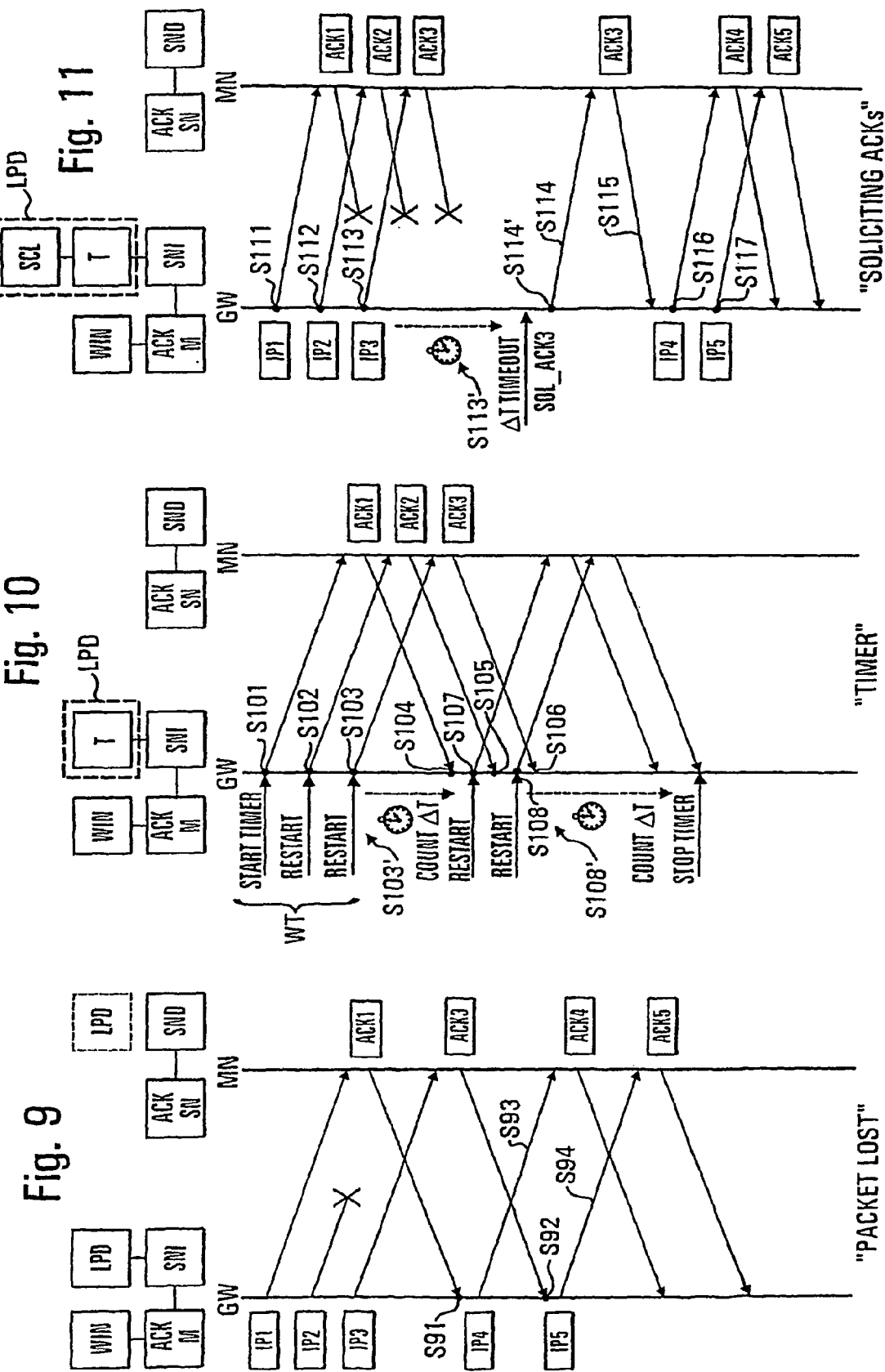

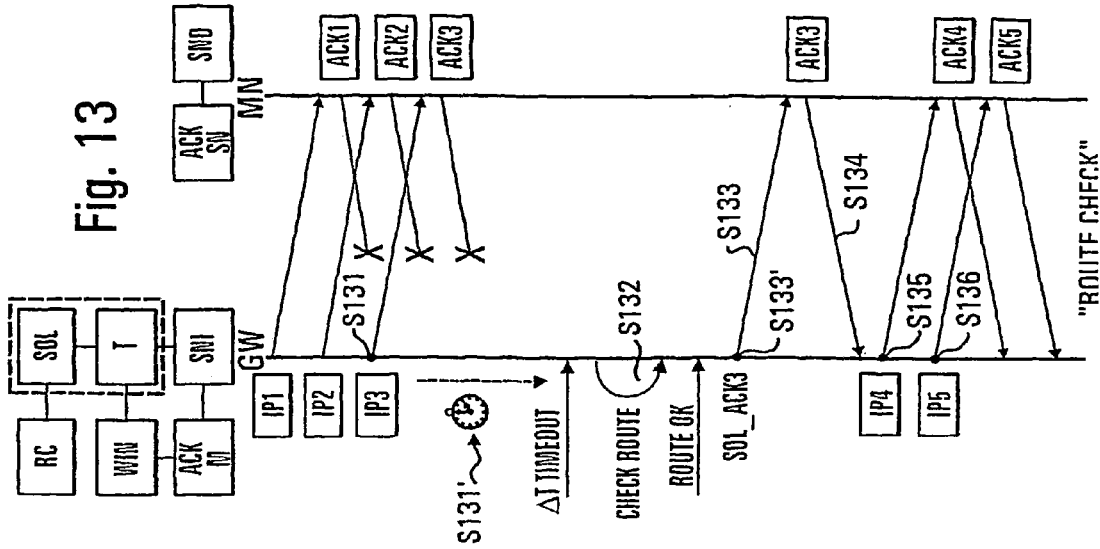
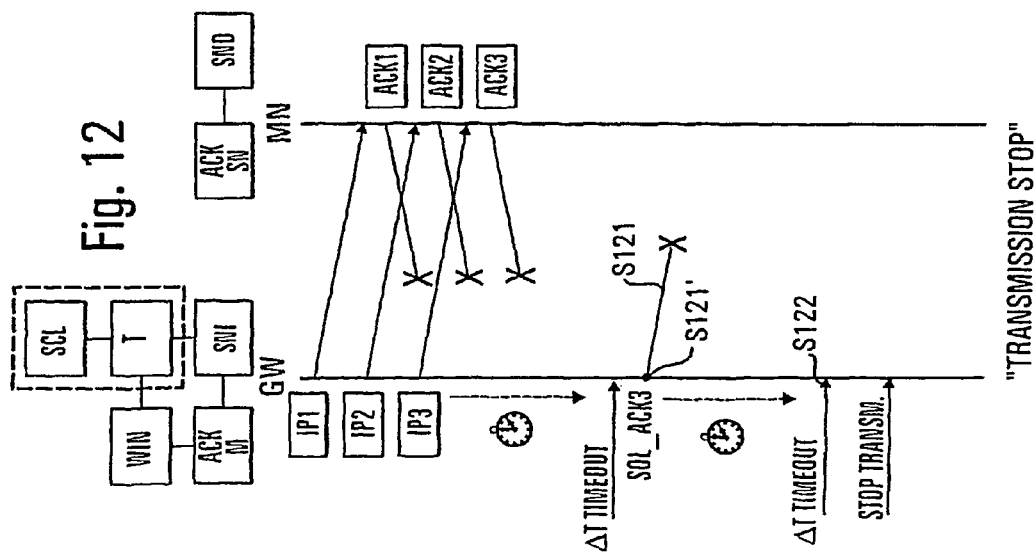

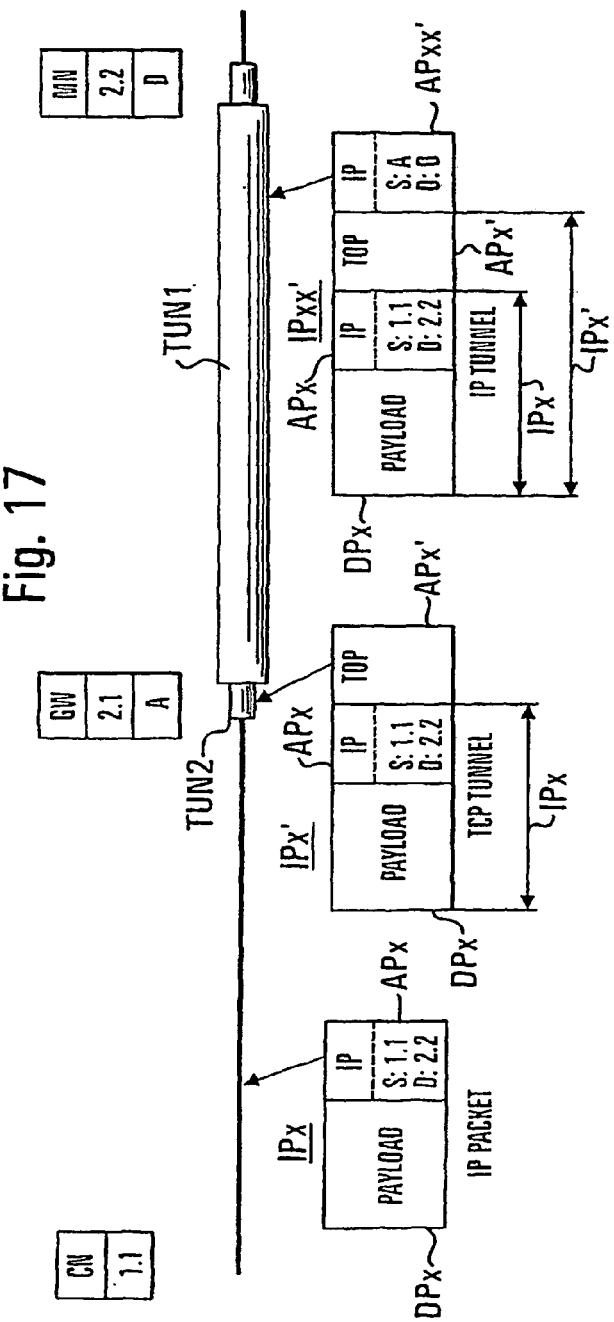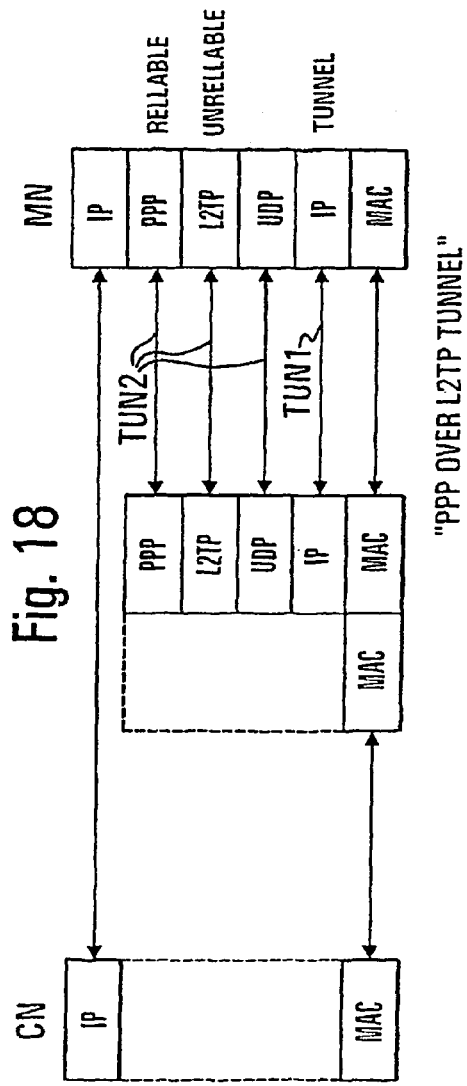

ACCURATE CONTROL OF TRANSMISSION INFORMATION AD HOC NETWORKS

FIELD OF THE INVENTION

The invention relates to the accurate control of transmission information in ad hoc networks, for example to the monitoring of packet transmission for an accurate accounting in ad hoc networks. More specifically, the invention relates to a gateway for forwarding transmission information between a first terminal node of a first network and a second terminal node of an ad hoc network, a terminal node of such an ad hoc network and a communication system comprising said first network with at least a first terminal node, said ad hoc network with at least second terminal node, and said gateway. The invention also relates to a method for forwarding transmission information between said first terminal node and the second terminal node of the ad hoc network.

As will be explained below with more details, one application area of ad hoc networks is the extension of existing cellular networks, in particular, mobile devices of private users can be used to relay data between the sending/receiving device and for example the base station of the cellular network. An intrinsic property of such ad hoc networks is that the network itself is only established "ad hoc", i.e. when needed or requested by particular private users. In this scenario mobile devices of other user may be used "ad hoc" to just relay data between the actual end device and the base station of the cellular network.

In such "ad hoc" configured networks, transmission information is typically forwarded from a gateway, e.g. a base station, to a terminal node of the ad hoc network through other relaying nodes. Whilst the gateway can prescribe a particular route through relaying nodes to the receiving terminal node, due to congestion or other problems along this route, the transmission information from the gateway might also be routed through other relaying nodes. The problem of how to find out which route the actual transmission information took in the ad hoc network is addressed in our parallel application PCT/EP03/02241.

However, even if the route taken by the transmission information can be established, there still exists the problem in ad hoc networks that the gateway simply forwards the transmission information to the relaying nodes of the ad hoc network without knowing whether the transmission information has actually reached the intended end terminal node. For example, the end terminal node may be switched off or the information transmission might have gone lost along the route due to failures of the wireless links. Thus, the gateway might carry on sending transmission information to this particular end terminal node whilst none of the transmission information has actually reached said node.

Hence, the gateway has no mechanisms to perform an accurate flow control of the transmission information in the ad hoc network. It is this problem which is addressed by the present invention.

The aforementioned problem of lack of flow control in the gateway—when forwarding transmission information to the end terminal node of the ad hoc network—becomes particularly apparent when considering an accurate accounting for the forwarding of the transmission information. Since for the establishment of an ad hoc network there should be an incentive for users to provide their devices as relaying devices because the relaying itself consumes memory, processing power and battery power, an accurate accounting is of particular importance in such ad hoc networks. However, since ad hoc networks are basically established within the framework of mobile communication networks, the accounting is still done in the gateway by merely considering the sent out transmission information without having any information about the question whether the data actually arrived at the end terminal node. Henceforth, the gateway might charge the end terminal node for transmission information which has been sent out but which has never reached the end terminal node. Thus, the accurate accounting is one of the problems which is addressed with the aim at providing an accurate flow control by the gateway.

BACKGROUND OF THE INVENTION

As already mentioned above, the present invention aims at providing a more accurate flow control for the forwarding of transmission information in ad hoc networks. Hereinafter, some basic functionalities of ad hoc networks will be explained with reference to FIG. 1 and FIG. 2. Further information about ad hoc networking can be found from "Wireless ad hoc networking—the art of networking without a network" by Magnus Frodigh et al. in Ericsson Review, No. 4, 2000, pages 248-263.

FIG. 1 shows a typical scenario at an airport where people can access local- and wide-area networks, for example through an WCDMA indoor base station BS and a HiperLan/2 access point AP. FIG. 1 also shows typical nodes of the ad hoc network, for example a first node MN1 formed by a personal area network of a notebook computer NC1 connected through a Bluetooth Connection to a personal digital assistant PDA1. Another node RN2 might consist of a personal area network PAN only formed by a mobile telephone MT2 and a personal digital assistant PDA2. The node MN3 is yet formed by another network of a personal digital assistant PDA3, a mobile telephone MT3 and a notebook computer NC3. However, a node like MN4 might simply be formed by a single mobile telephone MT4. Thus, in FIG. 1 user's devices can both interconnect with one another and connect the local information points—for example, to retrieve updates on flight departures, gate changes and so on. Thus, in FIG. 1, for example the node MT4 and the node MN1 might directly access information from the base station BS. For example, a user might retrieve e-mail via a HiperLan/2 interface to a notebook computer in a briefcase, but read messages and reply to them via his or her personal digital assistant PDA1, PDA3.

On the other hand, node MT4 might not only directly be connected to the mobile telephone MT2 through the base station BS but by using the node MN1 as a relaying node, i.e. the node MN1 can be used to relay traffic to the node RN2 through Bluetooth Connections which are only established "ad hoc", i.e. not permanently. This relaying of transmission information is known as "single or multiple radio hop architecture", i.e. transmission information from a node outside the ad hoc network might be transmitted to the end terminal node (e.g. RN2) through one (singe hop) or more (multiple hop) other ad hoc nodes.

Such a scenario is further illustrated in FIG. 2 with four interconnected nodes RN1, RN2, RN3, MN1 wherein two nodes RN1, RN3 have an internet connection via a Bluetooth LAN access point and a GPRS/UMTS phone respectively through a GPRS network GN and two routers RT. Clearly, if for example a terminal node connected to the internet or corporate IP network IN sends transmission information directed to the end terminal node MN1, the nodes RN1 and RN2 will act as relaying nodes which forward the transmission information through communication routes which are only set up on request, i.e. "ad hoc". As shown in FIG. 2, one of the perhaps most widespread notions of the mobile ad hoc network is that the network is formed without any central administration and consists of mobile nodes that use a wireless interface to send transmission information.

It should also be noted that of course there is no need that the relaying nodes and the end terminal node are in close vicinity to each other, i.e. the ad hoc devices can also relay traffic between devices that are out of range. In addition, since the ad hoc network is based on for example a wireless mobile communication system the mobile devices move around (mobility) and thus the "ad hoc" i.e. spontaneously formed network might be spread out over large distances.

Furthermore, provided that a node is registered as an ad hoc node, the ad hoc nodes will use spontaneously assigned ad hoc addresses rather than globally fixed addresses. Thus, one of the central aspects of ad hoc networks is that these are formed spontaneously ("ad hoc") amongst the devices which are registered as ad hoc nodes. Rather than administered by a central facility, the ad hoc nodes will establish communication connections such as a wireless Bluetooth Connection, on demand and by themselves.

Since the ad hoc nodes themselves establish connections amongst each other in an ad hoc, i.e. spontaneous way, thus increasing the coverage of existing base stations without requiring additional hardware, users need an incentive for providing their devices for the relay service. One possible incentive is that the users get a reward for the relaying service and only the end terminal node is charged for receiving the transmission information just like in conventional mobile networks. However, even if there is provided a gateway GW providing the connection to the first network IN, the gateway GW has no information whether a particular relaying node has relayed transmission information and/or whether the end node has actually received any transmission information. Thus, there is no actual accurate flow control or traffic information monitoring of the transmission information forwarding between the nodes of the ad hoc network. For example, the charging accounting for information transfer within the ad hoc network can only be based by using a mechanism in the gateway GW which accounts for the forwarded transmission information.

This problem is further illustrated with reference to FIGS. 3a, 3b which shows the typical communication system SYS considered by the present invention. The communication system SYS includes a first network IN with a least first terminal node CN (hereinafter also called the corresponding node), an ad hoc network AHN with at least a second terminal node RN1-RN4, MN and a gateway GW for forwarding transmission information TI between the first terminal node CN of said first network IN and said second terminal node RN1-RN4, MN of said ad hoc network AHN. Each node CN, RN1-RN4, MN has a corresponding transmission/reception unit TRC, TR4, TRN and also the gateway GW itself has such a transmission/reception unit TRG. The transmission/reception unit TRN is adapted to receive transmission information TI from the other terminal CN through the gateway GW either through the main route MR or through an alternative route AR which is set up as wireless connections between the individual ad hoc nodes RN1, RN2, RN3. Each of the nodes RN1-RN4, MN also has a routing means, e.g. RM4 and RMN, for achieving the relaying function as described above. The first terminal node CN has a global source identifier (global source address) SAC and each of the ad hoc nodes RN1-RN4, MN have a corresponding target address, e.g. TA4, TAN. In the transmission information memory TIS of the first terminal node CN information such as a destination address for the transmission information is stored. The transmission information TI sent out from the first terminal node CN is received by the transmission/reception unit TRG of the gateway GW and is then transmitted to the second terminal node RN1-RN4, MN. The first network IN is any kind of an operator-controlled network, for example the Internet or a mobile communication network. The gateway GW can be an access point or a base station. Not necessarily does the gateway GW belong to the ad hoc network. That is, the gateway GW is merely to form the interface between the corresponding node CN and the nodes of the ad hoc network. Thus, the ad hoc network AHN consists for example of a mobile node MN that is sending and receiving data and several candidate relaying nodes RN1-RN4. The corresponding node CN can be located anywhere outside of the ad hoc network, not necessarily in the operator-controlled network. In this scenario, the node MN could transmit data over RN2, RN1 and GW to the corresponding node CN. Furthermore, it is assumed that users of all mobile devices have a contract with the cellular network operator.

FIG. 3a also shows an accounting unit ACC adapted to determine charging information CH for the transmission of the transmission information TI to the second terminal node. For determining the charging information CH, the accounting unit ACC may determine the charging information CH on the basis of some transmission characteristics TCH determined by a transmission information characteristics determining unit TIM. These transmission characteristics TCH can also be stored in the transmission information memory TIS, as shown in FIG. 4a. If for example the determined transmission characteristics TCH comprise a data amount DAM and a transmission speed TRT, the accounting means ACC can determine a charging information CH of 7 Cent for the forwarding of transmission information of 2 MB with a transmission rate of 64 kbit/s to the target node RN4 having the target address TA. Thus, with a data set as shown in FIG. 4a in the transmission information memory TIS, it is easy for the accounting unit ACC to provide some kind of accounting for the downlink (from corresponding node CN to the target ad hoc node).

For uplink transmission information (for example from the ad hoc mobile node MN to the corresponding node CN through the gateway GW), it is obvious that the gateway GW only receives and charges/rewards transmission information which did not get lost. Thus, in the uplink direction the gateway GW can always perform some kind of accurate accounting.

However, problems arise regarding the accurate flow control or accurate accounting regarding the downlink transmission information. Actually, users should only be charged and rewarded for transmission information that they actually have transmitted and should only be charged for transmission information which they actually have sent or received. However, since the gateway GW has no information whatsoever what happens to the transmission information TI after it has been sent out by the transmission/reception unit TRG of the gateway GW, the accounting unit ACC can only make a guess whether or not the transmission information has actually reached the desired ad hoc and terminal node, e.g. MN. This is generally true, not only for the specific example of having to provide an accurate accounting. Namely, the gateway GW can generally transmit transmission information but it has no actual control over it because no further information about the possible arrival or non-arrival of the transmission information is available. Therefore, the gateway GW can not generally perform any other accurate control (flow control) of the transmitted transmission information.

For example, as shown in FIG. 3b, if there is a cut-off of a wireless link along the main route MR between two relaying nodes RN1, RN2, then the gateway GW has no possibility to know whether or not the transmission information TI has actually arrived at the second terminal node MN. Thus, the gateway GW, i.e. its transmission information memory TIS can only store information about all transmission information which it has sent to the second terminal node MN in order to perform proper charging and rewarding. However, the entire accounting is intrinsically based on the assumption that the entries in the transmission information memory TIS reliably relate to a transmission information which has actually reached the second terminal node. If not, as shown in FIG. 3b, the mobile end node MN would be charged for transmission information which has not been successfully delivered.

On the other hand, the user of the second end terminal node MN might simply contest that it has received any transmission information, even if it has arrived, in order not to be charged by the gateway GW. In such a scenario, the gateway GW has no means to verify and to demonstrate to the second terminal node MN that the transmission information TI has actually arrived and that the charging information CH is accurate. Since the gateway GW has no evidence that the transmission information TI has actually arrived at the second terminal node MN, despite the fact that the transmission information TI has arrived, a misbehaving second terminal node MN might achieve that it does not have to pay for the transmission information which it actually has received.

It should be noted that the above described problem of accurate accounting is only one sub-problem of the general problem that the gateway GW cannot provide an accurate flow control of the packets. For example, also other flow control mechanisms in the gateway GW might require accurate knowledge about the fact whether or not the transmission information TI has actually arrived at the desired target terminal node MN. For example, another flow control for the transmission information TI could involve the increase or decrease of transmission rate or the complete stoppage of transmitting transmission information TI if it was known that one of the wireless links on the main route MR or the alternative route AR has failed.

Another example of insufficient flow control is the occurrence of a congestion on the main route MR or alternative route AR which calls for a reduction of transmission rate. However, in conventional ad hoc networks the gateway GW has no possibility of detecting any reasons of loss of transmission information, such as noise, congestion or misbehavior of users/devices.

In Bakre A.V. et al.: "Implementation and Performance Evaluation of Indirect TCP", IEEE Transactions on Computers, IEEE Inc., New York, Vol. 46, No. 3, 1 March 1997, pages 260-278, XP000685987, ISSN: 0018-9340, there is described an implementation and performance evaluation of indirect TCP. In more detail, there is presented the implementation and performance of I-TCP, which is an indirect transport layer protocol for mobile wireless environment. Throughout comparison with regular TCP shows that I-TCP performs significantly better in a wide range of conditions related to wireless losses and host mobility. There is also described the implementation and performance of I-TCP handoffs.

Further, in US 2002/036991 A1 (Inoue Atsushi), there is described a communication system using access control for mobile terminals with respect to a local network. In a communication system, even when a mobile terminal device belonging to some mobile carrier does not have a right or a qualification for accessing the fixed communication network via the local network/gateway that is given in advance, this mobile terminal device is enabled to access the fixed communication network via the local network/gateway. This is achieved by carrying out a procedure for paying the fee from the user of the mobile terminal device to the fixed communication network provided or a procedure for monitoring the mobile terminal device.

Further in Patent Abstract of Japan, Vol. 2002, No. 11, 6 November 2002 & JP 2002 209028 (Mitsubishi Electric Corp.), 26 Jul. 2002, there is described an adhoc network where a start point terminal, relay terminals, and an end point terminal are used to dynamically configure a communication network. The relay terminal records a fact of communication path setting execution together with identifiers of the start point terminal and the end point terminal and the recording is used for a basis of charging information.

Further, in EP-A-0 903 905 Tokyo Shihaura Electric Co.), there is described a scheme for reliable communications via radio and wire networks, using transport layer connection. Here, a gateway device determines whether or not to carry out a set-up of a connection in divided forms according to an information content of a packet that contains a transport layer protocol data unit requesting a set-up of the transport layer connection between the radio terminal of the radio network and the wire terminal of the wire network.

Further, in U.S. 2002/045424 A1 (Lee Hee Dong), there is described a Bluetooth private network and communication method thereof. The Bluetooth private network comprises Bluetooth access points, each functioning as a base station in each of Bluetooth piconets, a gateway for functioning as an interface between a public network and the Bluetooth private network, sending a beacon signal to each of the Bluetooth devices in local Bluetooth networks to locate the Bluetooth device and a router for functioning as an interface between each of the Bluetooth access points.

SUMMARY OF THE INVENTION

As explained above, a conventional gateway GW and a conventional terminal node RN1-RN4, MN are deficient because they do not allow an accurate control of transmission information in the ad hoc network. For example, an adaptation of flow control parameters, such as transmission rate, transmission amount, as well as an accurate accounting is not possible in conventional ad hoc networks. The present invention aims at avoiding these disadvantages.

Specifically, it is an object of the present invention to provide a gateway, a terminal node of an ad hoc network, communication system as well as a method in an ad hoc network which respectively allow an accurate flow control of transmission information within the ad hoc network.

This object is solved by a gateway for forwarding transmission information between a first terminal node of a first network and a second terminal node of an ad hoc network, comprising:

a transmission/reception unit adapted to receive transmission information from said first terminal node and to transmit said transmission information to said second terminal node; and an acknowledgment information detection unit adapted to detect the receipt of acknowledgment information from said second terminal node acknowledging that said second terminal station has received said transmission information.

Furthermore, this object is solved by a terminal node of an ad hoc network for exchanging transmission information with another terminal node of another network (IN) connected to said ad hoc network through a gateway, comprising: a transmission/reception unit adapted to receive transmission information from said another terminal node through said gateway; and an acknowledgment information transmission unit adapted to transmit to said gateway acknowledgment information acknowledging that said transmission/reception unit has received said transmission information.

The object is also solved by a communication system including a first network with at least a first terminal node, and an ad hoc network with at least a second terminal node, and a gateway for forwarding transmission information between said first terminal node of said first network and said second terminal node of said ad hoc network.

The object is also solved by a method for forwarding transmission information between a first terminal node of a first network of a communication system and a second terminal node of an ad hoc network of said communication system, comprising the following steps in a gateway of said communication system: receiving, in said gateway of said communication system, transmission information from said first terminal node and transmitting, from said gateway, said transmission information to said second terminal node; detecting (S5c5), in said gateway, the receipt of acknowledgment information from said second terminal node acknowledging that said second terminal station has received said transmission information.

The object is also solved by a method for forwarding transmission information between a first terminal node of a first network of a communication system and a second terminal node of an ad hoc network of said communication system, comprising the following steps in said second terminal node: receiving, in said second terminal node transmission information from a gateway of said communication system; and transmitting, from said second terminal node, to said gateway acknowledgment information acknowledging that said second terminal node has received said transmission information.

Furthermore, the object is also solved by a method for forwarding transmission information between a first terminal node of a first network of a communication system and a second terminal node of an ad hoc network of said communication system, comprising the following steps in said communication system: receiving, in a gateway of said communication system, transmission information from said first terminal node and transmitting, from said gateway, said transmission information to said second terminal node; receiving, in said second terminal node, said transmission information from said gateway; transmitting (S5c4), from said second terminal node, to said gateway acknowledgment information acknowledging that said second terminal node has received said transmission information; and detecting, in said gateway, the receipt of said acknowledgment information from said second terminal node acknowledging that said second terminal station has received said transmission information.

An accurate flow control of the transmission information in the ad hoc network is possible in accordance with the invention, as defined above, because there is provided reliable information (acknowledgement information) indicating whether transmission information has reached the end terminal node or not. Furthermore, another advantage is that a misbehavior of the second terminal node receiving the transmission information is inhibited because it is not possible for the second terminal node any longer to receive the transmission information without being charged for it.

The provision of accurate flow control of transmission information within the ad hoc network provides several advantages for example in connection with embodiments directed to an accurate accounting. For example, the accounting unit may be adapted to determine charging information for the transmission of said transmission information to said second terminal node if said acknowledgment information detection unit detects the receipt of acknowledgment information for the transmission of said transmission information to said second terminal station. Thus, the end terminal node is only charged for acknowledged transmission information.

If the second ad hoc network is a packet switched network, the transmission information comprises one or more transmission packets and said acknowledgement information comprises one or more acknowledgement packets, a transmission characteristics determining unit is adapted to determine the transmission characteristics for each acknowledged transmission package of the transmission information. Thus, an accurate accounting and charging is possible on a packet by packet basis.

Particularly advantageous is if said gateway comprises a sequence number insertion unit adapted to insert into each transmission packet a sequence number indicating the transmission order of the respective transmission packet in a sequence of transmission packets. Preferably, also said terminal node comprises a sequence number determining unit adapted to determine in each received packet a sequence number indicating the transmission order of the respective transmission packet in a sequence of transmission packets; wherein said acknowledgment information transmission unit is adapted to transmit to said gateway acknowledgment packets respectively containing the detected sequence number of the received packet whose receipt is to be acknowledged with said respective acknowledgment packet. Thus, the gateway not only receives an acknowledgement information indicating that transmission information in general was received but an acknowledgement information which acknowledges particular transmission packets. Thus, the accuracy in the accounting or in the flow control may be further enhanced because the gateway has detailed information about the individual packets that have received the end terminal node.

It is further advantageous to provide in the gateway a transmission window unit adapted to set a predetermined transmission window for said transmission/reception unit to successively transmit transmission packets to said second terminal node; wherein said transmission/reception unit is adapted to successively transmit to said second terminal node transmission packets within said transmission window; and wherein said transmission/reception unit is adapted to slide said transmission window one or more packets to form a new transmission window and to successively transmit to said second terminal node one or more successive transmission packets within said new transmission window which have not already been transmitted in the previous transmission window whenever the receipt of an acknowledgment packet, acknowledging the receipt of a transmission packet of the previous transmission window, is detected by said acknowledgment information detection unit. The advantage is that here the acknowledgment packets are accumulative, i.e. an acknowledgement with a certain sequence number additionally acknowledges all preceding packets (if the roundtrip time remains constant). If the roundtrip time stays constant it is sufficient for an accurate flow control if the gateway only receives the acknowledgement packet for the transmission packet which was the last one to be transmitted from the gateway within the transmission window.

The present invention allows for a more accurate flow control by the provision of the acknowledgement information. However, it might still be the case that a transmission packet and/or an acknowledgement packet gets lost for some reason during the transmission to the gateway and the second terminal node. Therefore, another embodiment of the invention comprises a lost packet detector adapted to detect that an acknowledgement packet or a transmission packet has gone lost during its transmission if after transmission of a predetermined number of transmission packets in the transmission window set by said transmission window unit, the sequence numbers in successive acknowledgment packets do not match with those set in the successive transmission packets.

Advantageously, the lost packet detector might comprise a timer adapted to count a predetermined time duration, said timer being started with each new transmission of a transmission packet, being stopped if an acknowledgement packet is received for the last transmitted transmission packet within said predetermined time duration or if not being stopped by the receipt of an acknowledgment packet, said timer expiring, wherein said TRN stops transmission.

An acknowledgement request unit may advantageously be provided, adapted to transmit to said second terminal node an acknowledgment request packet including a predetermined sequence number of a transmission packet which was transmitted but for which no acknowledgement information has as yet been detected by said acknowledgment information detection unit, said acknowledgment request message requesting from said second terminal node the transmission of an acknowledgment packet acknowledging the receipt of the transmission packet having said predetermined sequence number.

Preferably, if said timer times out and no acknowledgment information is detected by said acknowledgment information detection unit within said time duration after transmission of the last transmission packet in said transmission window, said acknowledgment request unit is adapted to transmit to said second terminal node an acknowledgment request packet including the sequence number of the last transmission packet transmitted in the transmission window.

Preferably, said timer is also started when said acknowledgment request unit starts transmitting said acknowledgment request package, wherein if said timer times out thereafter and no acknowledgment information is detected by said acknowledgment information detection unit within said time duration after transmission of said acknowledgment request package, said transmission/reception unit stops transmission of further transmission packets.

Preferably, a route check unit is provided, adapted to detect whether a transmission route to said second terminal node exists.

Preferably, said transmission/reception unit stops transmission of further transmission packets if after said timer times out, said route check unit detects that no transmission route exists.

Preferably, said transmission/reception unit is adapted to retransmit an already transmitted transmission packet having a specific sequence number in response to receiving a retransmission request packet including paid specific sequence number from said second terminal node.

In a particularly advantageous embodiment of the invention said transmission/reception unit comprises a first tunnel setup unit for setting up a first tunnel link between said gateway and said second terminal node, wherein said transmission/reception unit transmits said transmission information and receives said acknowledgment information to and from said second terminal node respectively through said first tunnel link. The tunnel will advantageously set up a kind of fixed "logical" link between the gateway and the second terminal node such that for example the entire transmission of transmission packets and acknowledgement packets always takes the same route through the relaying nodes between the gateway and the second end terminal. The usage of the first tunnel is also advantageous in cases where the corresponding node and the ad hoc terminals do not have the same format of addresses. Another advantage of the tunnel set-up is that the packet from the corresponding node remains intact, i.e. its format is not changed in the gateway when it is transmitted through the tunnel to the second terminal node.

Advantageously, said first tunnel setup unit sets up said first tunnel link by encapsulating transmission packets into modified transmission packets generated and transmitted by said transmission/reception unit.

The first tunnel set-up unit is mainly provided to perform the accurate flow control, for example for accounting purposes. On top of the first tunnel another transport protocol can be run. Therefore, advantageously, said transmission/reception unit comprises a second tunnel setup unit for setting up a second tunnel link encapsulated within said first tunnel link between said gateway and said second terminal node, wherein said transmission/reception unit transmits said transmission information and receives said acknowledgment information to and from said second terminal node respectively by using said second tunnel link encapsulated within said first tunnel link.

The advantage of using the second tunnel together with the first tunnel is that the second tunnel may be based on a protocol such as TCP, i.e. a non IP protocol, which allows flow control such as the exchange of acknowledgements whilst the first tunnel will then provide the IP routing.

Preferably, said second tunnel setup unit sets up said second tunnel link by encapsulating transmission packets received from said first terminal node into modified transmission packets generated by said transmission/reception unit; and said transmission packets, which are encapsulated by said first tunnel setup unit into said modified transmission packets transmitted by said transmission/reception unit, are said modified transmission packets encapsulated by said second tunnel setup unit.

Preferably, said terminal node can comprise a packet retransmission request unit adapted to transmit to said gateway a retransmission request packet including a sequence number of a transmission packet which is requested to be retransmitted from said gateway.

Further advantageous embodiments and improvements of the invention may be taken from the dependent claims. Hereinafter the invention will be described with reference to its advantageous embodiments with reference to the drawings.

BRIEF DESCRIPTION OF THE DRAWINGS

In the drawings:

FIG. 4a shows the contents of a transmission information memory TIS of the gateway GW shown in FIG. 3a;

FIG. 4b shows the contents of a transmission information memory TIS' of a gateway GW in accordance with the invention;

FIG. 5c shows the principle message flow of the method for an acknowledgement transmission in the method shown in FIG. 5b;

FIG. 7 shows the insertion of sequence numbers and the transmission of transmission packets IP1-IP5 and acknowledgement packets ACK1-ACK5 with reference to a transmission window, in accordance with one embodiment of the invention;

FIG. 8 shows a similar flow chart as in FIG. 7, for the case of a lost acknowledgement package, in accordance with one embodiment of the invention;

FIG. 9 shows a flow chart similar as in FIG. 7, for the case of a lost transmission packet IP2, in accordance with another embodiment of the invention;

FIG. 10 shows an embodiment of using a timer T in connection with the transmission of transmission packets within a transmission window WIN;

FIG. 11 shows a flow chart using a timer T and the sending of an acknowledgement request packet SOL_ACK3, in accordance with another embodiment of the invention;

FIG. 12 shows the case of a transmission stop when using the timer T and the acknowledgement request packet SOL_ACK3, in accordance with another embodiment of the invention;

FIG. 13 shows a message flow for the case of performing a route check before sending the acknowledgement request packet SOL_ACK3;

FIG. 17 shows the encapsulating of a second tunnel TUN2 inside the first tunnel TUN1; and FIG. 18 shows a protocol stack of using different second tunnel protocols UDP, L2TP, PPP on top of the first tunnel protocol IP.

In the drawings, the same or similar reference numerals are used to designate the same or similar steps and features. Whilst FIG. 6 shows a block diagram of the gateway GW and the second terminal node RN, MN including in combination different embodiments of the invention, on top of the FIGS. 5c, and 7-15 the respective units are shown which are most responsible for respectively carrying out the functions and steps shown in the respective features. Therefore, it should be understood that the units shown in combination in FIG. 6 may also be used separately in accordance with the different embodiments of the invention.

PRINCIPLE OF THE INVENTION

Figure 5A:
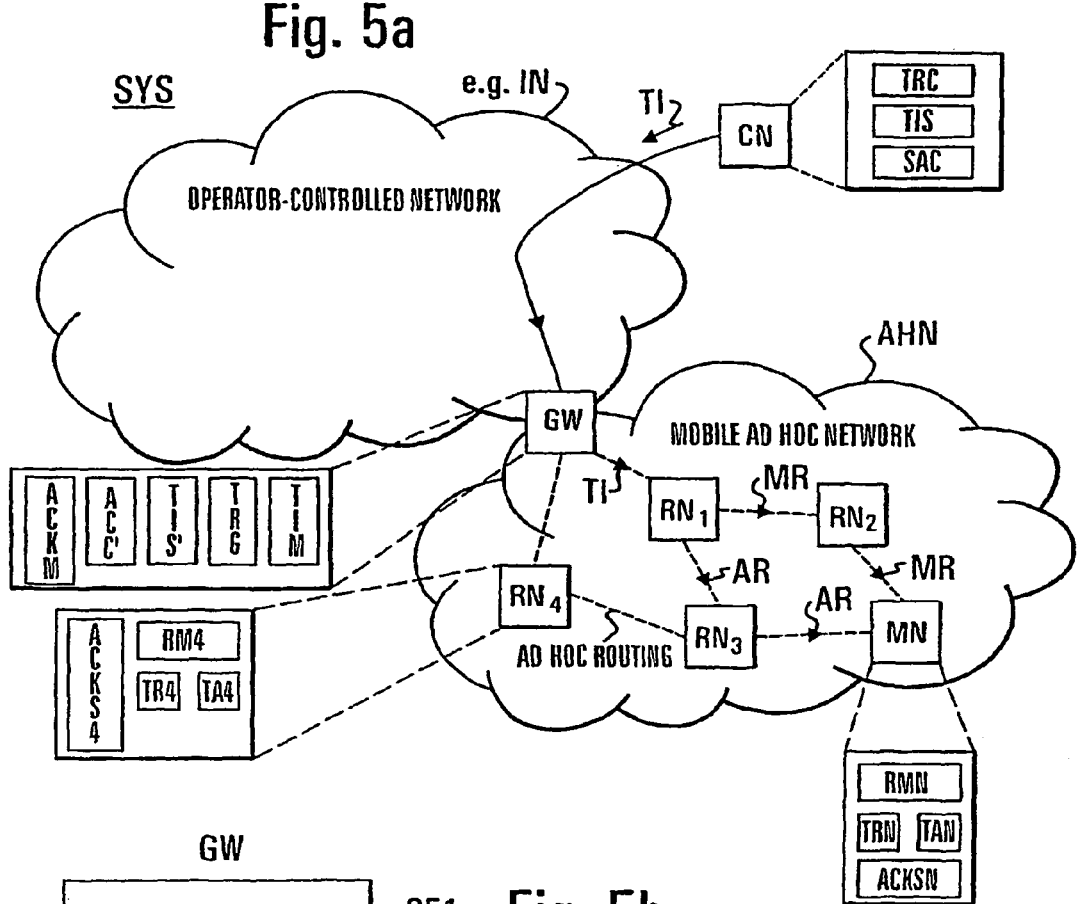
FIG. 5a shows a principle overview of a communication system SYS with a gateway GW and a second terminal node MN in accordance with the invention.

FIG. 5a shows a principle overview of the communication system SYS to which the invention relates. The communication system SYS includes a first network IN with at least a first terminal node CN and ad hoc network AHN with at least a second terminal node RN1-RN5, MN and a gateway GW for forwarding transmission information TI between said first terminal node CN of said first network IN and said second terminal node of said ad hoc network AHN. Hereinafter, the first terminal node will also be called the corresponding node CN, as shown in FIG. 5a. Furthermore, it should be noted that the first network IN can be any kind of operator-controlled network, for example the Internet or any mobile communication network. The ad hoc network AHN may be any kind of network formed in accordance with the principles of ad hoc networking as outlined above. That is, the ad hoc network comprises ad hoc nodes RN1-RN4 which can act as relaying nodes and one node MN is shown to be the receiving node for the transmission information TI. Any kind of ad hoc routing link can be used, for example Bluetooth Connections or typically other wireless links. However, the establishment of the ad hoc network is not restricted to any specific kind of communication connections and comprises all communication connections for setting up an ad hoc network spontaneously as described above.

Figure 1:
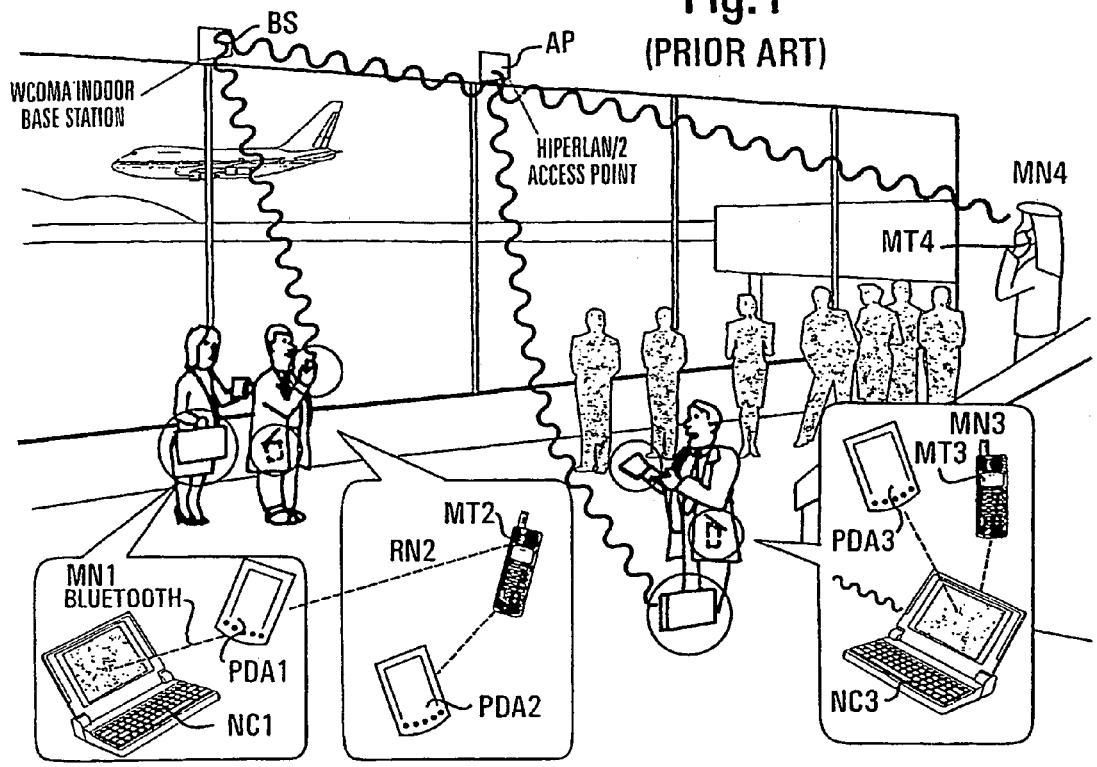
FIG. 1 illustrates the principle of ad hoc networking in an airport scenario, in accordance with the prior art.
Figure 2:
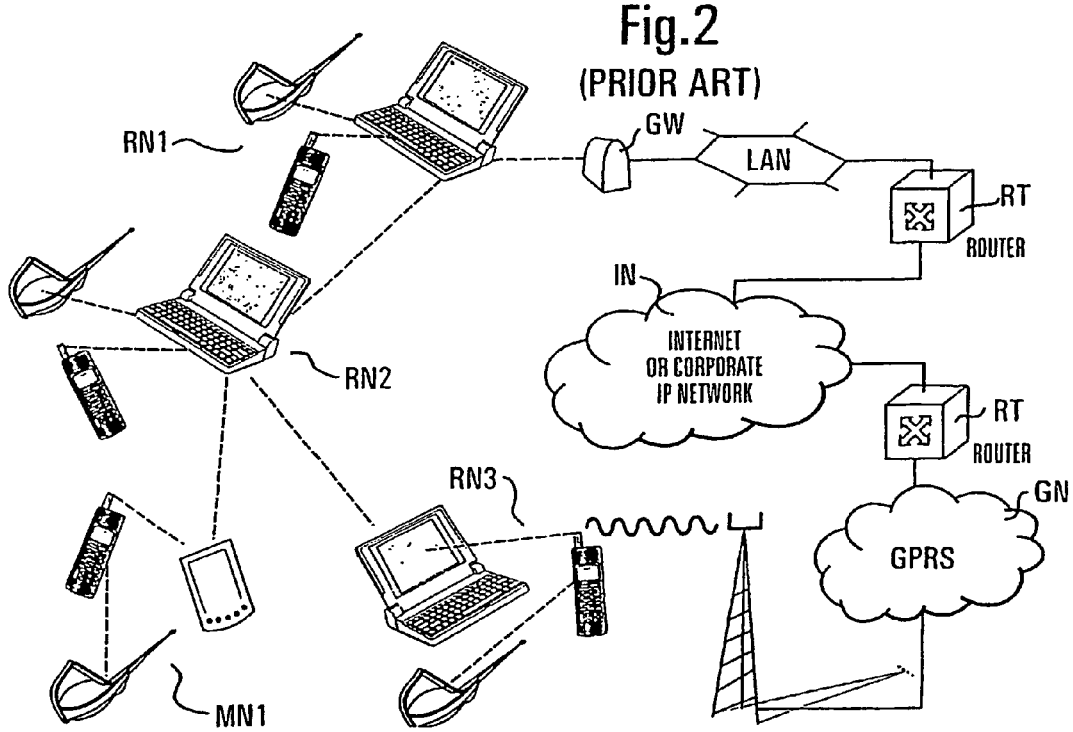
FIG. 2 shows a personal area network scenario with four interconnected ad hoc nodes two of which have an internet connection via a Bluetooth LAN access point and a GPRS/UMTS telephone, in accordance with the prior art.

The second terminal node MN and the relaying nodes RN1-RN4 can be any kind of devices as long as they allow a relaying of transmission information. Examples for the relaying nodes are a mobile telephone, a notebook computer, a personal digital assistant, a laptop computer etc. Examples of the gateway GW comprise a base station BS or an access point AP, for example a WCDMA indoor-based station BS and a HiperLAN/2 access point, as shown in FIG. 1.

Furthermore, although hereinafter many principles of the embodiments of the invention will be explained below with reference to packet transmission inside the mobile ad hoc network AHN, it should be noted that many embodiments of the invention are not restricted to a packet transmission inside the mobile ad hoc network AHN. It is also perceivable that the ad hoc network is set up by establishing for example wireless radio links by means of other transmission methods such as OFDM or TDM.

Figure 3A:
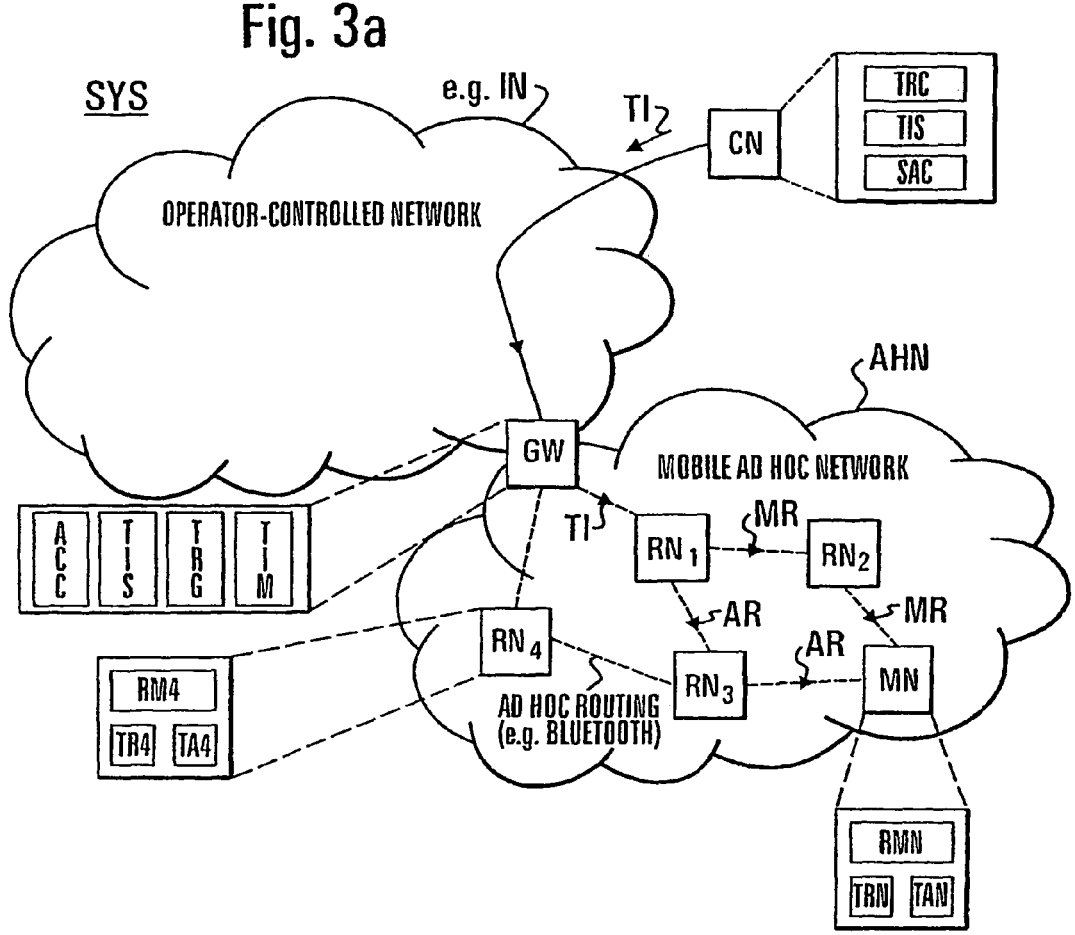
FIG. 3a shows a communication system SYS in which transmission information TI is transmitted from a first terminal node CN outside an ad hoc network AHN to a second terminal node MN inside the ad hoc network.
Figure 3B:
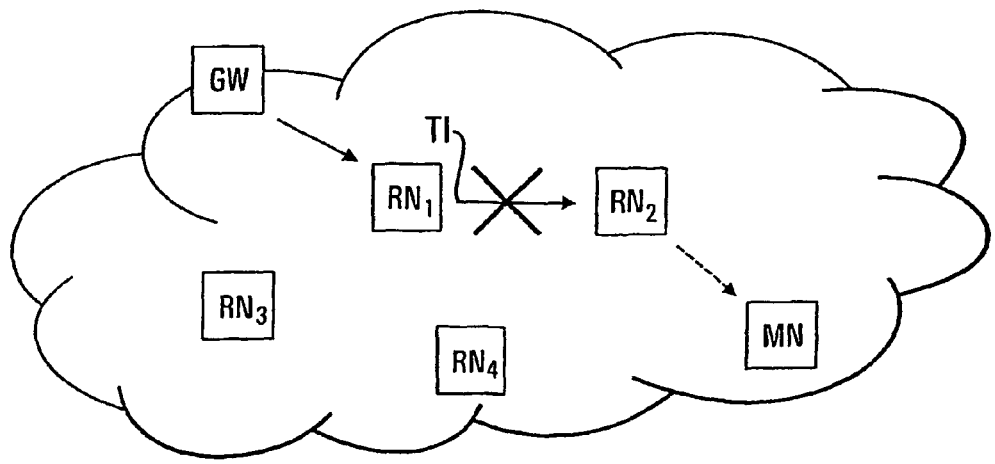
FIG. 3b shows a packet lost scenario in the communication system SYS of FIG. 3b.

Comparing the communication system SYS of FIG. 5a with the conventional communication system SYS of FIG. 3a, it becomes clear that the gateway GW and the second terminal node MN, in addition to a respective transmission/reception unit TRG and TRN, respectively, also comprise an acknowledgement information detection unit ACKM in the gateway GW and an acknowledgement information transmission unit ACKSN in the second terminal node MN. The acknowledgement information detection unit ACKM is adapted to detect the receipt of acknowledgement information ACTAN, ACTAN', ACTAN" from said second terminal node MN. The acknowledgement information ACTAN, ACTAN', ACTAN'acknowledges that the second terminal station MN has received said transmission information.

On the receiving node MN side, the acknowledgement information transmission unit ACKSN is adapted to transmit to the gateway GW said acknowledgement information ACTAN, ACTAN', ACTAN" acknowledging that the transmission/reception unit TRN of the second terminal node MN has received the transmitted transmission information TI, TI', TI". That is, in accordance with one principle of the invention each transmission of downlink transmission information TI, TI', TI" to the second terminal MN is acknowledged with an acknowledgement information from the second terminal node, as shown in FIG. 5c. Thus, an accurate flow control can be performed in the mobile ad hoc network AHN. For example, now the gateway GW always has certified information that actually the downlink transmission information has arrived at the second terminal node MN or—when no acknowledgement is sent—that there has been a problem such as congestion, lost package or misbehavior of users/devices—inside the ad hoc network. Thus, the flow control in the ad hoc network AHN can be improved.

Preferably, the forwarding of the transmission information and acknowledgement information between the gateway GW and the second terminal node MN (or more precisely between their transmission/reception units TRG and TRN, respectively) is performed through a security association (trust relationship) between the gateway GW and the second terminal node MN. Trusted relationship or security association, in this context, means standard authentication procedures such that for example the second terminal nodes RN1-RN4 and MN will trust each other that they will always relay packets or transmission and acknowledging information if they are registered to become ad hoc terminal nodes of an ad hoc network. Furthermore, also the relaying nodes RN1-RN4 should preferably have such a trusted relationship with the gateway GW or amongst themselves because they likewise need to be charged or rewarded when receiving or relaying information. The build-up of trust relationships or authentication procedures as such is well known in the art of mobile communication technology and does not need further explanation here.

FIG. 5c shows for the gateway side GW and the second terminal node side MN the respective steps carried out in accordance with the principle method of the invention. In step S5c1 the gateway GW of said communication system receives the transmission information TI from the first terminal node CN. In step S5c2 the transmission/reception unit TRG transmits the transmission information TI to the second terminal node MN after for example having built up the trusted relationship (security association).

In step S5c3 the transmission/reception unit TRN of said second terminal node MN receives the transmission information TI from the gateway GW. In step S5c4 the acknowledgement information transmission unit ACKSN transmits to the gateway GW the acknowledgement information ACTAN which acknowledges that the second terminal node MN has received the transmission information TI. In step S5c5 the acknowledgement information detection unit ACKN of the gateway GW detects the receipt of the acknowledgement information ACTAN and can now safely assume that the second terminal node MN has received the transmission information TI.

Using the acknowledgement information ACTAN, ACTAN', ACTAN", the gateway GW can perform an accurate flow control of information inside the ad hoc network AHN. For example, if there is a delay or congestion along the main route MR or the alternative route AR resulting in a delayed transmission of the acknowledgement information, the gateway GW can for example adjust the transmission rate etc. depending on the transmission characteristics. The more accurate flow control is particularly advantageous for performing an accurate accounting for the transmission information on the downlink connection between the gateway GW and the second node MN.

Improved Accounting Embodiment

Figure 4C:
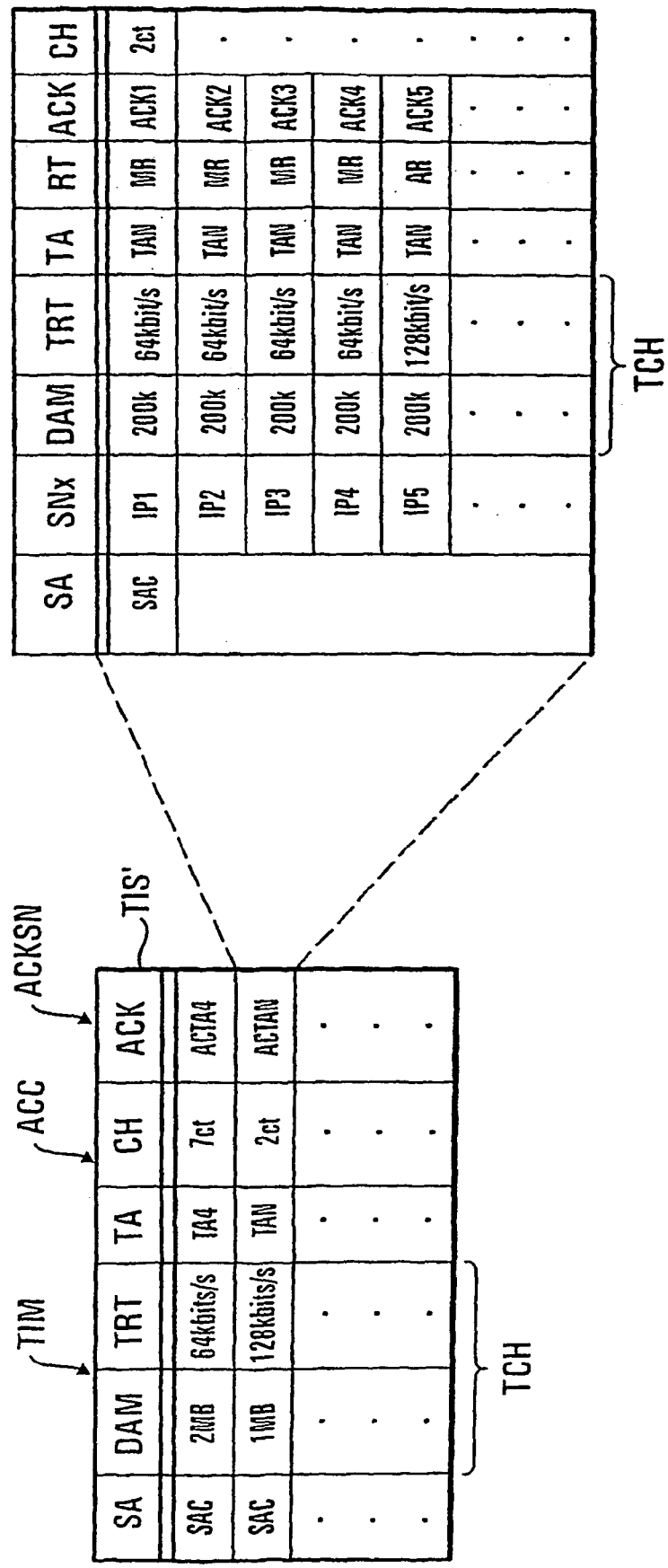
FIG. 4c shows a further embodiment of the transmission information memory TIS' in accordance with the invention, for the case of accounting for individual transmission packets IP1-IP5.
Figure 5B:
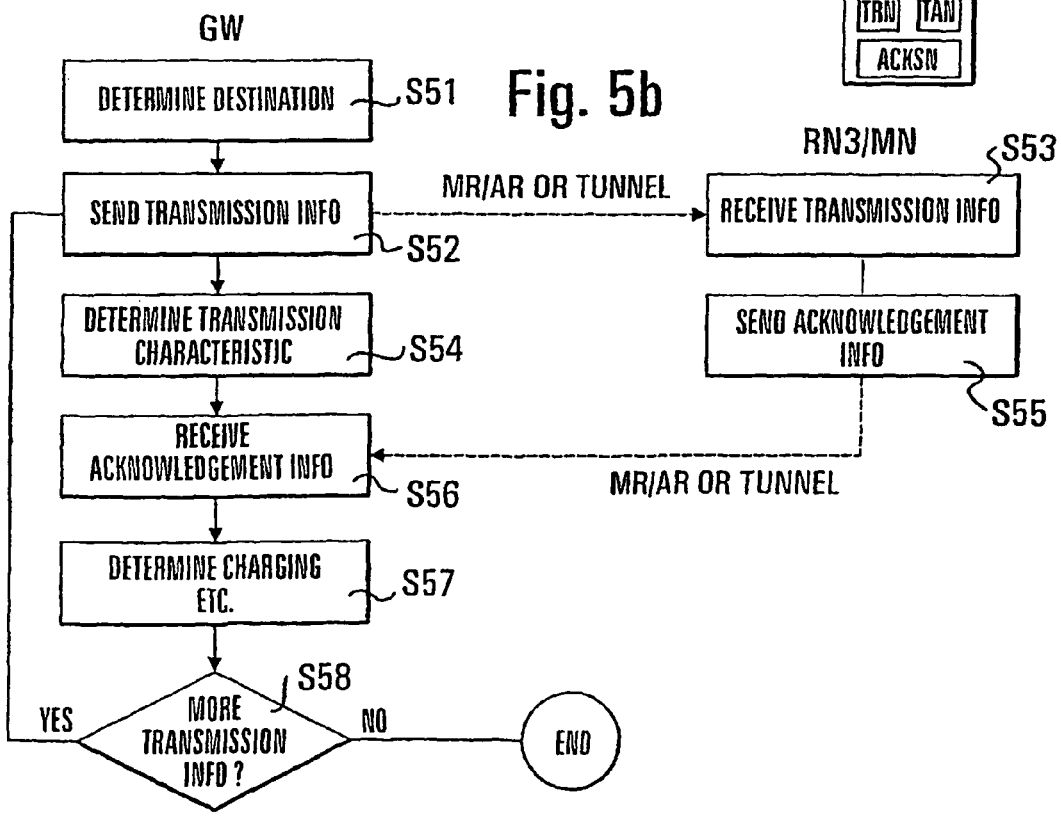
FIG. 5b shows a principle flow chart of the accounting method in accordance with an embodiment of the invention.
Figure 6:
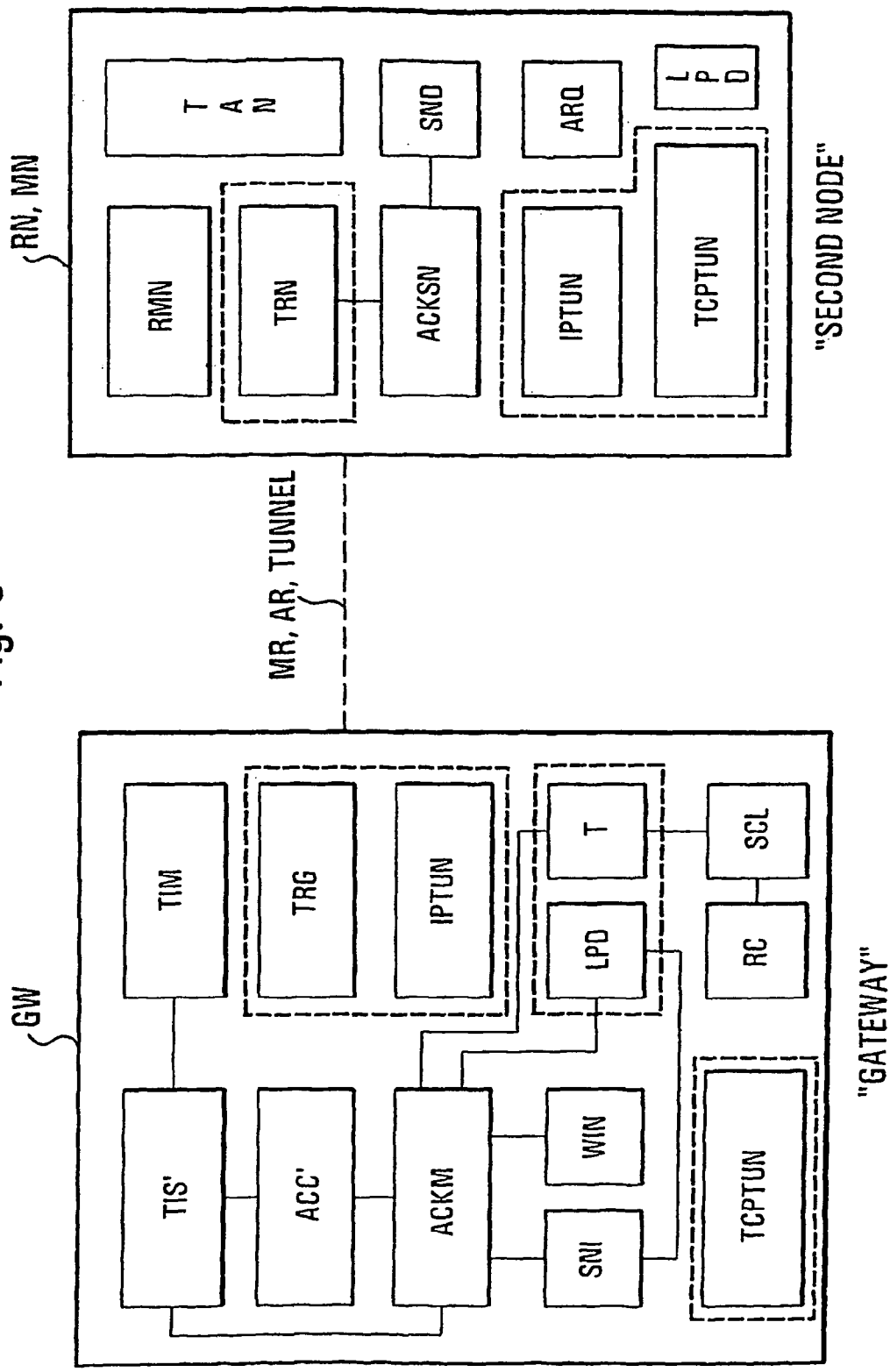
FIG. 6 shows the principle block diagram of a gateway GW and a second terminal node RN, MN in accordance with the invention.

FIG. 6 shows an accounting unit ACC' as being part of the gateway GW. This accounting unit ACC' is used in the principle flow chart of the accounting method in accordance with an embodiment of the invention as shown in FIG. 5b. FIG. 4b shows the contents of a transmission information memory TIS' of the gateway GW in accordance with the invention and FIG. 4c shows the contents of the transmission information memory TIS' for the case of packet transmission between the gateway GW and the second node MN.

More specifically, the accounting unit ACC' is adapted to determine charging information CH for a transmission of the transmission information TI, TI' TI" to the second terminal node MN if said acknowledgement information detection unit ACKM detects the receipt of acknowledgement information ACTAN, ACTAN', ACTAN" for the transmission of said transmission information to said second terminal station MN. As can be seen from FIG. 4b, in addition to the source address SA, the transmission data amount DAM, the transmission rate TRT (or the transmission timing), the target address TA and the charging information CH, the transmission information memory TIS' in accordance with one embodiment of the invention also comprises an entry for the acknowledgement information (in FIG. 4b designated with ACTA4, ACTAN). That is, the accounting unit ACC' in accordance with one embodiment of the invention only performs a calculation of transmission information charges CH and performs a charging of the second terminal node MN, if an actual acknowledgement information ACTA4, ACTAN has been received from second terminal node MN. Thus, it is avoided that on the one hand the second terminal node MN is charged for transmission information TI, TI', TI" which has actually not reached the second terminal node MN, and on the other hand, the gateway GW could decide to only send further transmission information TI', TI" if for a first sent transmission information TI a corresponding acknowledgement has been received. For example, a misbehaving node might indeed have received the transmission information TI but may decide not to transmit the acknowledgement information ACTAN in order to avoid being charged for the reception of the transmission information TI. However, if the gateway GW, i.e. its transmission/reception unit PRG, decides to discontinue the transmission of further transmission information unless an acknowledgement is received, it can be avoided that further transmission information is sent to misbehaving nodes.

FIG. 5b shows an example of a flow chart of an accounting method in accordance with one embodiment of the invention. On the left-hand side the respective functions of the accounting on the gateway GW side are shown and on the right-hand side the respective functions of the second node MN are shown.

In Step S51 the gateway GW, i.e. its transmission/reception unit TRG, receives transmission information TI from the corresponding node CN. The transmission information TI will contain a source address SAC and a target address, for example TAN. Therefore, in step S51 the transmission/reception unit TRG of the gateway GW must first determine the appropriate destination information to determine the node to which the transmission information TI is to be sent. In step S52 (corresponding to step S5c2 in FIG. 5c) the transmission/reception unit TRG of the gateway GW sends the transmission information TI to the second terminal node MN. In step S53 the second terminal node MN receives the transmission information and in step S55 the second terminal node MN sends an acknowledgement information ACTAN to the gateway GW. In step S56 the acknowledgement information is received. Whilst the transmission information is sent in step S52 to the second terminal node MN, the transmission information characteristics determining unit TCM determines the transmission characteristics TCH for the transmission of the transmission information to the second terminal node MN. As explained with reference to FIG. 4a, such transmission characteristics may comprise preferably one or more selected from the group consisting of the data amount DAM, a transmission speed or a transmission rate TRT, a transmission route, MR, AR along which the transmission information has been transmitted to the second terminal node, and a delay time of the packet transmission. The delay time may be the actual delay time which the transmission information needed to be transmitted from the gateway GW to the second terminal MN. In accordance with another example, the delay time may be the predetermined delay for the transmission of the transmission information; for example, a predetermined quality of service (QoS) may be determined by the gateway GW and the transmission information will only be transmitted to the second terminal node MN with the prescribed quality of service (QoS), i.e. with a predetermined delay time.

If the transmission characteristics have been determined in step S54, for example as those shown in FIG. 4b, the accounting unit ACC' determines the charging information CH in step S57, on the basis of the transmission characteristics, after the acknowledgement was received in step S56. That is, only if actually an acknowledgement information, for example ACTAN or ACTR4, is received in step S56, the accounting unit ACC' will perform the determination of the charging information CH on the basis of the transmission characteristics TCH. Whilst in FIG. 5b it is shown that the determination of the charging information CH in step S57 is performed after receiving the acknowledgement information in step S56, it may also be provided that first several transmission information such as TI, Ti', TI" are respectively transmitted, whereafter all acknowledgement information are collected and finally the charging information is being determined. Important in FIG. 5b is that the charging information CH will only be determined (and the user of the second end terminal node MN will only be charged) if an acknowledgement information is received for the respective transmission information. If there are more transmission information to be sent from the gateway GW to the second terminal node MN in step S58 in FIG. 5b, then the flow chart will be re-entered at step S51. If there is no more transmission information in step S58 the procedure is ended.

Whilst in FIG. 4b it is shown that the transmission information memory TIS' is adapted to store one or more selected from the group consisting of a source address SAC, the destination address TA of said transmission information TI, TI', TI", said determined transmission characteristics TCH, said determined charging information CH and said acknowledgement information ACTAN, it should be understood that the transmission information memory TIS' in FIG. 4b is only one example of such a memory used for determining the charging information CH. Other examples for the transmission information memory TIS' may be devised by a skilled person. For example, it may be devised that the acknowledgement information ACK in FIG. 4b is actually not stored but is only used as a trigger for initiating the calculation of the charging information CH. Therefore, it should be understood that the calculation of charging information CH and the usage of specific transmission characteristics TCH as shown in FIG. 4b is only one example. Important is, that the user of the second end terminal MN will only be charged with charging information CH, determined on the basis of any kind of parameters reflecting the transmission of the transmission information, if an appropriate acknowledgement information is present for the transmitted transmission information. However, other types of calculating charging information or assessing transmission characteristics may be used.

For example, if the ad hoc network AHN is a packet switched network AHN the transmission information TI, TI', TI" comprises one or more transmission packets IP1-IP5 and said acknowledgement information ACTAN, ACTAN', ACTAN" comprises one or more acknowledgement packets ACK1-ACK5 (see for example FIG. 7), the transmission information memory TIS' may be constituted as shown in FIG. 4c. As shown in FIG. 4c, the transmission characteristics determining unit TIM determines transmission characteristics DAM, TRT for each acknowledged (by ACK1-ACK5) transmission packet IP1-IP5. Since all five packets IP1-IP5 were acknowledged a complete charging information CH=2 cent is determined by the accounting unit ACC' for this transmission of the five packets IP1-IP5. However, it may also be devised, in accordance with another embodiment of the invention, that a charging information CH is calculated individually for each packet.

Although in FIG. 4c preferably, in accordance with another embodiment, a so-called sequence number SN (as explained below) may be used, it should be understood that the accounting for individual transmission packets may also be performed without the usage of such a sequence number. For example, if the first packet (as transmission information) is sent out in step S5c2 in FIG. 5c, the gateway GW might simply wait for the receipt of an acknowledgement information ACTAN confirming the receipt of a transmission packet. Thus, the gateway GW knows that the sent out packet IP1 has safely arrived at the second terminal node MN. Only after receiving the acknowledgement packet ACTAN, the gateway will then send out the next packet IP2 and will once more wait for the receipt of an acknowledgement packet ACTAN'. If the gateway GW always waits for the receipt of an acknowledgement for the last sent transmission packet, there is no need to insert into the respective transmission packet and the acknowledgement packet respective information characterizing the transmission packet and indicating in the acknowledgement packet the specific transmission packet for which an acknowledgement is done.

However, the usage of the sequence number SM indicating the transmission order of the respective transmission packet IP1-IP5 in a sequence of transmission packets IP1-IP5 may preferably be used as a marker or a packet-specific identifier such that acknowledgements may be returned to the gateway GW on an individualized basis, i.e. on a packet-specific basis. This is hereinafter further explained with reference to the advantageous embodiments in FIGS. 7-15.

Sequence Number Insertion

As already partially indicated above, the gateway GW shown in FIG. 6 comprises a sequence number insertion unit SNI adapted to insert into each transmission packet IP1-IP5 a sequence number SN, such as 1, 2, 3, 4, 5, indicating the transmission order of the respective transmission packet IP1-IP5 in a sequence of transmission packets. Similarly, in the terminal node, a sequence number determining unit SND adapted to determine in each received packet a sequence number indicating the transmission order of the respective transmission packet in a sequence of transmission packets is provided, wherein the acknowledgement information transmission unit ACKSN of the second terminal node MN is adapted to transmit to said gateway GW acknowledgement packets ACK1-ACK5 respectively containing the detected sequence number of the received packet whose receipt is to be acknowledged with said respective acknowledgement packet ACK1-ACK5. Thus, the sequence number SN serves the purpose as a general packet identifier such that the transmitted transmission packet may be identified on the second terminal side and such that the acknowledgement packet not only generally acknowledges the receipt of a transmission packet but the receipt of a specific acknowledgement packet. This sequence number or, more generally, a packet identifier is denoted with SNx in the example in FIG. 4c. Thus, as shown in FIG. 7, each transmission packet IP1, IP2, IP3, IP4, IP5 . . . IPx having a packet identifier 1, 2, 3, 4, 5 . . . x is acknowledged by a respective acknowledgement packet ACK1, ACK2, ACK3, ACK4, ACK5 . . . ACKx with packet identifiers 1, 2, 3, 4, 5 . . . x. The sequence number or packet identifier could be stored in a IPv4 option field or in a Ipv6 destination option header.

Thus, the relationship between packets and acknowledgement packets can be provided by packet identifiers, for example a sequence number. Although FIGS. 7-15 shows the usage of a "number" as a packet identifier, it should be noted that also other identifiers may be used for providing the packet-specific acknowledgements. Thus, the gateway has detailed information about all packets which have received the mobile node and can therefore perform a more accurate flow control, for example also a more accurate accounting, as shown in FIG. 4c.

FIG. 7 shows a flow chart of steps using the insertion of sequence numbers (packet identifiers) in an acknowledgement procedure, in accordance with one embodiment of the invention. In step S71 a packet identifier or a sequence number 1 is inserted in the first transmission packet IP1. In step S72 the transmission packet IP1 is transmitted to the second terminal node MN. In step S73 the sequence number determining unit SND of the second terminal node MN determines the packet identifier or sequence number 1 in the received transmission packet IP1. For example, the sequence number 1 indicates the position 1 of the transmission packet IP1 in a sequence of transmission packets IP1-IP5. In step S74 the acknowledgement packet including the detected sequence number or packet identifier is transmitted to the gateway GW. In step P75 the acknowledgement information detection unit ACKM determines on the basis of the specific acknowledgement packet ACK1 having a packet identifier 1 that the transmission packet IP1 with the packet identifier (sequence number) 1 was indeed received by the second terminal node.

Since each transmission packet with a specific packet identifier is acknowledged with a respective acknowledgement packet carrying the packet identifier identifying the transmitted transmission packet, a clear relationship between packets and acknowledgements can be provided. That is, even if the roundtrip time RTT (see FIG. 5c; the roundtrip time RTT is the minimum time the gateway GW has to wait between transmitting a transmission packet and receiving an acknowledgement packet thereof) is not constant for each transmission packet IP, IP2, IP3—hence causing a possible receipt of the acknowledgement packet ACK3 earlier than the receipt of the acknowledgement packet ACK1—there is still a clear relationship between the sent packet and the returned acknowledgement information.

For example, independently as to which acknowledgement information ACK1-ACK5 arrives first, the accounting unit ACC' can determine an individualized charging information CH individually for each specific transmission packet IP1-IP5. For example, as shown in the embodiment in FIG. 4c, each packet IP1-IP5 which has been sent by the gateway GW is now acknowledged by a specific acknowledgement packet ACK1-ACK5. In this case, charging information CH can be determined by the accounting unit ACC' individually for each packet.

If there was no individualized relationship between the sent transmission packet and the returned acknowledgement packet, it may happen that the second terminal node MN just acknowledges "the receipt of a packet" and not of a "specific packet" and may in this manner claim that it is only to be charged for a transmission packet which has lower charging information CH than another packet. This is avoided by the usage of the packet identifiers (sequence numbers).

As explained above, in a first embodiment of the method in accordance with the invention, as shown in FIG. 7, the gateway only sends new packets to the mobile node (second terminal node) MN if it has received an acknowledgement for a proceeding packet. However, for example depending on the roundtrip time RTT, this entails that the next packet (e.g. IP2 after IP1) can only be sent after a certain minimum roundtrip time RTT. For example, the roundtrip time RTT may be in the order of 1 second and therefore a new packet will only be sent after the expiration of a time period of 1 second.

Thus, the gateway assigns each IP packet a sequence number before sending it to the mobile node MN. If sequence numbers are used as packet identifiers the sequence numbers may be ascending. As shown in FIG. 7, the mobile node MN acknowledges each packet with an acknowledgement with the same sequence number (packet identifier). As explained above in accordance with a first embodiment, the gateway GW only sends a new packet if it has indeed received the acknowledgement for the proceeding packet. However, due to the quite considerable roundtrip time RTT, the gateway GW uses a technique which is herein called the "window principle".

Window Principle

A particularly advantageous embodiment of the present invention for sending packets and receiving acknowledgements is if the gateway GW uses the sliding window principle, as illustrated in FIG. 7. Instead of sending one packet and waiting for an acknowledgement before sending the next packet the gateway GW sends out several packets wherein the number of sent out packets is specified by a predetermined transmission window WT. This transmission window WT is set by a transmission window unit WIN inside the gateway GW, as shown in FIG. 6. The predetermined transmission window WT indicates to the transmission/reception unit TRG to successively transmit to said second terminal-node a number of transmission packets.

The transmission window WT is one of the group consisting of a transmission time window indicating a predetermined transmission time period (for example, if there is a fixed transmission rate a time period will indirectly indicate the number of packets to be sent out within the transmission window), a transmission window number of successive transmission packets (directly indicating the number of transmission packets), and a transmission data amount indicating a predetermined amount of data to be transmitted in one or more of said successive transmission packets (if for example a fixed payload is possible per transmission packet, the transmission window data amount will indicate indirectly the number of packets to be transmitted within the transmission window). However, independently on what kind of transmission window is used, the transmission window indirectly or directly indicates the number of transmission packets to be sent to the second terminal node MN without waiting for an acknowledgement. That is, instead of sending out one packet and waiting for an acknowledgement before sending the next packet, the gateway GW sends out several packets. If the transmission packets include the sequence number (which may be preferably a sequence of ascending numbers), the transmission window can also directly indicate the sequence numbers of the transmission packets to be sent out successively before waiting for an acknowledgement. In the example in FIG. 7, the transmission window specifies successive three sequence numbers of transmission packets which should be sent out.

As shown in FIG. 7, there exists a first window WT which comprises the transmission of 3 packets IP1, IP2, IP3. Likewise, FIG. 7 also shows an updated or new window WT' with packets IP2, IP3, IP4, window WT" with packets IP3, IP4, IP5 and window WT'" with packets IP4, IP5, IP6. Thus, each window comprises a number of transmission packets which are sent out successively without waiting for an acknowledgment packet for a previous packet.

As shown in FIG. 7, the next window WT' is the one-packet-slided version of the previous window WT, the window WT" is the one-packet-slided version of the previous window WT', and the window WT'" is the one-packet-slided version of the previous window WT". These new windows are arrived at whenever an acknowledgment packet is received. That is, after sending out the first, second and third packet IP1, IP2, IP3 within the first window WT, the first acknowledgement packet-ACK1 is received at the gateway GW. The receipt of this acknowledgement packet ACK1 for the first packet IP1 triggers the sliding of the imaginary transmission window WT to the window WT' now comprising the packets IP2, IP3 and IP4.

Every new receipt of an acknowledgment packet such as ACK2 or ACK3 will respectively slide the window further one packet, namely from WT' to WT" after receiving ACK2 and from WT' to WT" after receiving ACK3. Thus, the window WT'" is arrived at after having received the three acknowledgment packets ACK1, ACK2, ACK3. In this case, the packet ACK3 is the acknowledgment that not only the first transmission packet IP1 was received but also the second and third transmission packets IP2, IP3 (provided that the round trip time RTT remains constant). Furthermore, the packet ACK2 is the acknowledgment that not only the first transmission packet IP1 was received but also the second transmission packet IP2 and the packet ACK1 is the acknowledgment that only the first transmission packet IP1 was received.

The same is true if an overtaking of transmission packets and acknowledgement packets occurs or even if a packet loss occurs. Actually, after transmitting the three packets IP1, IP2, IP3 in the window WT, the acknowledgement packet ACK1 should be received if the round trip time remains constant and the window would be slid one packet to the window WT'. However, if instead only the acknowledgment packet ACK3 is received, acknowledging also the receipt of IP2, IP3, then the window WT is immediately slid to the window WT'". Thus, one can also say that the first, second and third acknowledgement packet ACK1, ACK2, ACK3 respectively acknowledging the receipt of the first, second and third transmission packet IP1, IP2, IP3 of the present window WT will respectively slide the window WT one, two or three packets to the window WT', WT" and WT". In this manner, the window WT is slid SN packets where SN is the sequence number SN contained in the respective acknowledgment packet acknowledging the receipt of the SN-th packet (and other packets with lower SN) at the second terminal node MN.

Thus, in the example of FIG. 7 the first step S7111 sets the predetermined transmission window WT to successively transmit three transmission packets IP1-IP3 to said second terminal node MN. In steps S72, S721, S722 these packets are successively sent to the terminal node MN. In steps S73, S731, S732 a receipt of the respective transmission packets IP1, IP2, IP3 is detected at the node MN and in response to this acknowledgement packets ACK1, ACK2, ACK3 are respectively sent in steps S74, S741, S742 to the gateway GW. In steps S61, S62, S63 the acknowledgement information detection unit ACKM respectively detects the receipt of the acknowledgement packets ACK1, ACK2, ACK3. As can be seen in FIG. 7, the transmission/reception unit TRG in step S75 sends out the next packet (i.e. the packet with the next higher sequence number 4) after the receipt of an acknowledgement package ACK1 is detected by the acknowledgement information detection unit ACKM. Furthermore, in step S75 the new transmission of the new transmission packet IP4 is performed with reference to a new transmission window WT'. Thereafter, if in step S62 the acknowledgement information detection unit ACKM detects the receipt of a further acknowledgement information packet ACK2, the window WT' is slid to the window WT" and the next transmission packet IP5 (with the next higher sequence number 5) is transmitted in step S751. When the next acknowledgement packet ACK3 is received, the window WT" is slid one packet to the window WT'" and the next transmission packet IP6 is transmitted in step S752. Thus, the transmission/reception unit TRG always successively transmits the packets within the current transmission window WT, WT', WT", WT'"; if for example packets IP1, IP2 and IP3 were already transmitted in the first window WT and this window WT is slid to the window WT', of course packets IP2, IP3 of this new window WT' have already been transmitted such that the packet to be transmitted next in the window WT' is the remaining not as yet transmitted packet IP4. If on the other hand only ACK3 is received the window WT is lid to WT'" and none of the packets IP4, IP5, IP6 have as yet been transmitted. Thus, in this case all the new packets IP4, IP5, IP6 of the updated new window WT'" will be sent. Thus, whenever the window WT, WT', WT" is updated to a new window WT', WT", WT'", the transmission/reception unit TRG will successively transmit those packets of the new window which have not been transmitted in the old window.

Since in FIG. 7 the roundtrip time RTT is assumed to be the same for each transmission/reception of transmission/acknowledgement packets, it is clear that the first acknowledgement to arrive will the acknowledgement packet ACK1. However, if the roundtrip time-RTT changes after the transmission of the first transmission packet IP1 in step S71, it might well be that the second acknowledgement packet ACK2 is the first one to arrive. As explained above, if ACK2 is the first acknowledgment packet to arrive, the transmission/reception unit TRG of the gateway GW slides the original window WT SN=2 packets to the new transmission window WT" comprising packets IP3, IP4, IP5 of which IP4 and IP5 have as yet not been transmitted, i.e. the transmission/reception unit TRG of the gateway GW starts transmitting the transmission packets IP4, IP5 of the window WT". Therefore, whenever it receives one of the three acknowledgement packets ACK1, ACK2, ACK3 after the transmission of transmission packets IP1, IP2, IP3_inside the first transmission window WT it transmits the remaining not as yet transmitted packets of the new window WT', WT", WT'" respectively set on the basis of SN in the respectively received acknowledgment packet ACK1 (SN=1, i.e. slide window 1 packet), ACK2 (SN=2, i.e. slide window 2 packets) and ACK3_(SN=3, i.e. slide window 3 packets).

As also already briefly mentioned above, whilst normally (if the roundtrip time RTT remains constant in the transmission window) the acknowledgement packet ACK1 will be the first one to arrive at the gateway GW thus sliding the window WT to the window WT', it might occur that the sending out of new not as yet transmitted packets in a new transmission window WT" or WT'" is triggered by an acknowledgement packet ACK2, ACK3 having sequence numbers larger than the first transmitted transmission packet IP1. In this case, the receipt of e.g. the acknowledgement packet ACK3 already triggers the sending out of new packets IP4, IP5, IP6 in the window WT''' whilst there is no guarantee that IP2 and IP1 have actually arrived at the second terminal node MN (since no acknowledgement information ACK2, ACK3 has been received as yet). The lack of receipt of ACK2, ACK1 can be due to a longer roundtrip time RTT or can be due to having lost a transmission packet and/or an acknowledgement packet. The two later cases will be treated hereinafter in FIGS. 8, 9.

It should be noted that in FIG. 7 there are three possibilities how a new packet, for example IP4, will be sent out after IP1, IP2, IP3 have been sent out. A first possibility is that after receiving the first acknowledgement packet ACK1 in step S61 the window WT is lid to WT' and this causes the transmission of IP4 (the remaining not transmitted packet in the new window WT'). Thus, independently of the receipt of the other acknowledgement messages ACK2, ACK3 the receipt of the first acknowledgement packet ACK1 already triggers the sending out of a further predetermined packet IP4 within the new transmission window WT'.

Another possibility is that after only receiving ACK2 the window WT is slid to the window WT'' and thus the next packet IP4 belonging to the next transmission window WT'' will be sent immediately and thereafter the succeeding packet IP5 which is also in the new window WT'' and has as yet not been transmitted.

A third possibility is that IP4 will be sent as the first packet in the window WT''' which is set when only ACK3 is received. After IP4 also packets IP5, IP6 in the window WT''' will be sent because these have not been sent in previous windows.

Thus, in one embodiment the successive receipt of the three acknowledgement packets ACK1, ACK2, ACK3 successively triggers the sliding of the window WT to the window positions WT', WT'', WT''' (one packet sliding of the window) and the sending of not as yet transmitted transmission packets successively in the respective new transmission window WT', WT'', WT'''. In another embodiment, in response to the receipt of only a respective acknowledgement packet ACK2 before ACK1 or ACK3 before ACK1, ACK2, the window WT is slid SN positions (SN packet sliding) and comprises respectively 2 or 3 new packets which have not been transmitted in the previous window WT.

The sliding window principle avoids that the performance of the communication system SYS is decreased due to a waiting process for acknowledgements. Of course, the optimum window size depends on the maximum throughput of the connection between GW and MN and the roundtrip time RTT, as explained before. The roundtrip time RTT is the time which the gateway GW has to wait between sending a packet and receiving the respective acknowledgement packet. For example, if the transmission window WT is a transmission window data amount, the transmission window data amount is the product between the transmission speed TRT on the transmission route MR, AR between the gateway GW and the second terminal MN and the roundtrip time RTT. For example, if the throughput is 1 Mbit/s (i.e. the transmission speed is 1 Mbit/s) and the roundtrip time RTT is 1 second, then the transmission window data amount is 1 Mbit.

As can be seen in FIG. 7, the acknowledgement packet ACK1, ACK2, ACK3 are accumulative, i.e. an acknowledgement with a certain sequence number additionally acknowledges all preceding packets. If for example the acknowledgement packet ACK3 "overtakes" the acknowledgement packet ACK1, then the acknowledgement packet ACK3 having a sequence number of 3 additionally acknowledges that the second terminal node MN has received also transmission packets IP1, IP2. Thus, whenever an acknowledgment packet is received, the gateway GW sends out one or more new packet(s) depending on which acknowledgment packet arrived at the gateway GW (sliding window technique).

Lost Packets

FIG. 8 shows the scenario of a lost acknowledgement packet, namely the transmission/reception unit TRN does send the acknowledgement packet ACK2 but the packet does not arrive at the gateway GW due to a packet loss on the transmission route. In the scenario of FIG. 8 the mobile node MN will not be charged for the lost packet because no acknowledgement information ACK2 is received (unless an acknowledgment packet with a higher sequence number than 2 arrives; for example, an acknowledgment packet ACK3 will acknowledge all previous packets in the sliding window technique and therefore it will acknowledge also packet IP2 thus causing a charging also for this packet).

Likewise, in FIG. 9 the transmission packet IP2 was indeed sent by the transmission/reception unit TRG of the gateway GW, however, it got lost on the transmission route to the second terminal node MN.

In the case of FIG. 8 and FIG. 9 a lost packet detector LPD in the gateway GW is adapted to detect that an acknowledgement packet ACK2 or a transmission packet IP2 has gone lost during its transmission if after transmission of a predetermined number of transmission packets IP1-IP3 in a transmission window WT set by the transmission window unit WIN, the sequence numbers in successive acknowledgement packets ACK1, ACK3 do not match with those set in the successive transmission packets IP1-IP3. For example, in FIG. 8 the acknowledgement packets ACK1, ACK3 are detected by the acknowledgement information detection unit ACKM causing the transmission of further transmission packets IP4, IP5 in step S83; S84. However, the sequence numbers in successive acknowledgement packets do not match with those set in the successive transmission packets. That is, the sequence of sequence numbers 1, 2, 3 of the transmission packets IP1, IP2, IP3 do not match with the sequence of sequence numbers 1, 3 detected from the successively received acknowledgement packets ACK1, ACK3. Thus, the gateway GW can determine with this kind of comparison (out-of-sequence detection) that either the acknowledgement packet ACK2 was not sent or that indeed the transmission packet IP2 has not even reached the second terminal node MN.

Likewise, in steps S91, S92 in FIG. 9 the lost packet detector LPD will determine an out-of-sequence of sequence numbers 1, 2, 3 of the transmission packets IP1, IP2, IP3 and the sequence numbers 1, 3 from the received acknowledgement packets ACK1, ACK3. Despite the sending of new packets IP4, IP5 in steps S93, S94, the lost packet detector LPD determines that either the transmission packet IP2 has not arrived at the second terminal node MN or that the acknowledgement packet ACK2 was not sent.

In both scenarios in FIG. 8 (lost acknowledgement packet) and in FIG. 9 (lost transmission packet), the mobile node MN is not charged for the lost transmission packet/acknowledgement packet because no acknowledgement is received at the transmitting gateway GW (unless an acknowledgment packet with a higher sequence number such as ACK2, or ACK3 is received as explained above, because higher sequence number acknowledgment packets also acknowledge the receipt of the packets of lower sequence number even if they have not been received). This is in the general context of the invention that the user of the second terminal node MN should only be charged for packets which have been acknowledged with acknowledgement information (acknowledgement packets).

However, the mobile node MN may be cheating, i.e. it might have actually received the transmission packet IP2 and might intentionally not send an acknowledgement packet ACK2 because it tries to avoid being charged for it. This can be avoided if in FIG. 8 and FIG. 9 the gateway GW always charges the second terminal node MN if a transmission packet IP2 has been sent out, independently whether an acknowledgement information is received. Of course, the gateway GW still needs some information which indicates that the packet has actually arrived because in accordance with the invention only packets should be charged which have reached the second terminal node. However, it is possible that a lost packet detector LPD is also provided on the terminal node side MN and this lost packet detector LPD detects an incorrect sequence of transmission packet sequence numbers, i.e. in FIG. 9 the lost packet detector LPD on the mobile node side MN detects 1, 3, . . . which is a clearly out-of-sequence detection because there is no sequence number 2. In such a case, as will be explained with more details with reference to FIG. 15, a request for retransmission can be made by the second terminal node MN for the out-of-sequence number 2 and in this case, after receiving the retransmission request, the gateway GW can use the retransmission request as a kind of acknowledgement that the second transmission packet IP2 was lost. In this case the accounting unit ACC' will only charge for the retransmitted packet rather than the original packet. Therefore, still even in this scenario only packets are charged for which some kind of confirmation/acknowledgement was received from the second terminal node MN.

On the other hand, in FIG. 8, the gateway GW, in particular its accounting unit ACC', can do nothing else but not charge for the transmission packet IP2 because neither a retransmission request nor an acknowledgement ACK2 is received. In this case, as explained with reference to FIG. 11, an acknowledgement request can be made from the gateway GW to the second terminal node MN to recollect the missing acknowledgement. If it is finally received, then the transmission packet IP2 will be charged.

However, it should first be understood in accordance with this embodiment that the gateway GW as well as the second terminal node MN can comprise a lost packet detector LPD which basically detects the lost acknowledgement and the lost packet if the sequence numbers which successively occur in a transmission window at the gateway GW and the mobile node MN do not coincide with the expected sequence.

Timer Embodiments

As was explained above with reference to FIG. 7, when using the sliding window principle, the receipt of one or more acknowledgment packets causes a sliding of the original window WT to a new window WT', WT'', WT''', either in successive single packet slides with each successive receipt of an acknowledgment packet ACK1, ACK2, ACK3, or in SN packet slides when only acknowledgment packets ACK2 or ACK3 are received. Additionally, a single acknowledgement for one of the packets transmitted within the transmission window WT acknowledges the receipt of the transmission of all transmission packets with lower order SN than contained in the acknowledgment packet.

FIG. 10 shows a flow chart for the steps carried out by the lost packet detector LPD comprising a timer T in accordance with another embodiment of the invention.

Essentially, a timer T of the lost packet detector LPD is adapted to count a predetermined time duration $\Delta T$. The timer T is started with each new transmission of a transmission packet, as indicated with steps S101, S102, S103, S107, S108. When counting the predetermined time duration $\Delta T$ after a respective restart, the timer is being stopped whenever an acknowledgement packet is received for the last transmitted transmission packet within the predetermined time duration $\Delta T$, as seen with steps S104, S105, S106. Thus, the timer is used to control the reception of acknowledgement packets.

Preferably, the time duration $\Delta T$ of the timer T should be adapted to the roundtrip time RTT, i.e. slightly longer.

As shown in FIG. 10 and as explained above with reference to FIG. 7 (window principle), a single acknowledgement such as the one received in step S104 in FIG. 10 acknowledges the transmission of all packets within the transmission window WT.

As also explained above regarding the "sliding window principle", the receipt of the acknowledgment packet ACK1 in step S104 slides or shifts the window WT to the window WT' and it is this shifting of the window which causes the timer T to be restarted because the new window WT'comprises still one packet, namely IP4, which has as yet not been transmitted (see also FIG. 7). For the transmission of this new packet IP4 in the new window WT' the timer T is restarted in step 107. Likewise, the ACK2 shifts the window WT to the window WT'' thus causing a transmission of IP5 and a restart of the timer T in step S108. Only the acknowledgment packet ACK6 actually stops the timer T because the receipt of ACK3 causes the transmission of IP6, i.e. the last not sent packet in the new_transmission window WT'''. Thus, all packets in the present window WT''' will have been sent and acknowledged and there is no reason for a further timer monitoring of any receipt of acknowledgment packets any more.

However, as shown in FIG. 11, there may be a case where after having sent three transmission packets IP1, IP2, IP3 the timer T counts the predetermined time duration $\Delta T$ and times out. That is, after starting the timer T in step S113 the timer counts the predetermined time duration $\Delta T$ within step S113' and, since all acknowledgement packets ACK1, ACK2, ACK3 were lost, there is a time out of the timer. One possibility in such a situation is that the gateway GW just accepts that no acknowledgement has been received whatsoever for any of the three transmission packets IP1, IP2, IP3 and just stops the transmission (transmission stop). A second possibility, as shown in FIG. 11, is that after step S113' (after the timer T has counted the predetermined time duration $\Delta T$), in step S114 an acknowledgement request unit SOL which may be part of the lost packet detector LPD, transmits to the second terminal node MN an acknowledgement request packet SOL_ACK3 including a predetermined sequence number 3 of a transmission packet IP3 which was transmitted but for which no acknowledgement information has as yet been detected by said acknowledgement detection unit ACKM. The acknowledgement request message SOL_ACK3 requests from the second terminal node MN the transmission of an acknowledgement packet ACK3 acknowledging the receipt of the transmission packet having the predetermined sequence number 3.

Whilst the acknowledgement request SOL may request the transmission of an acknowledgement packet having an specified sequence number, in accordance with one example of this embodiment, the acknowledgement request unit SOL is adapted to transmit to said second terminal node MN an acknowledgement request packet SOL_ACK3 including the sequence number 3 of the last transmission packet IP3 transmitted in the transmission window WT.

As shown in FIG. 11, the transmission of the acknowledgement request packet SOL_ACK3 in step S114 causes the mobile node MN to transmit the acknowledgement packet ACK3 in step S115 whereafter further transmissions of packets IP4 and IP5 start with a respective starting of the timer T in step S116, S117 whenever a new transmission packet is transmitted.

However, as shown in FIG. 11, of course the acknowledgement request package SOL_ACK3 transmission in step S114 is a new packet transmission just as the transmission of transmission packets IP1, IP2, IP3. Therefore, if after the transmission of the transmission packet IP3 and the starting of the timer ST in step S113, the timer T times out in step S113', it is also preferable that the timer T is started when the acknowledgement request unit SOL starts transmitting the acknowledgement request package SOL_ACK3.

Whilst in FIG. 11 the acknowledgement packet ACK3 stops the timer and the timer is started again in step S116 for the new transmission of packet IP4, FIG. 12 shows a case where the timer is set in step S121' when sending the acknowledgement request package SOL_ACK3 in step S121. If in step S122 the timer T times out and no acknowledgement information is detected by said acknowledgement information detection unit ACKM within said time duration after transmitting said acknowledgement request package SOL_ACK3, the transmission/reception unit TRG stops the transmission of further transmission packets after step S122. The reasons for not receiving the requested acknowledgement packet ACK3 in FIG. 12 thus causing the time out of the timer T in step S21, can be manifold reasons. One is that also the acknowledgement request package SOL_ACK3 did not reach the second terminal node MN because it got lost on the way, as shown in FIG. 12. Another possibility is that the second terminal node MN did either actually not send the acknowledgement packet ACK3 or the acknowledgement packet ACK3 got lost on its way to the gateway GW. The timer T takes care of all these situations by performing a transmission stop if no acknowledgement packet ACK3 is received within the predetermined time duration $\Delta T$.

As may be understood from FIG. 11 and FIG. 12, if all acknowledgement packets get lost (or are not sent by the second terminal node MN), the gateway GW does not send new packets and hence does not restart the timer T. This results in the time outs, as illustrated in FIG. 11 and FIG. 12. In FIG. 11 the gateway GW solicits an acknowledgement from the mobile node for the last sent packet. The mobile node resends the acknowledgement in FIG. 11 and the remaining packets IP4, IP5 can be transmitted. The same procedure can be applied if the transmission packets get lost instead of the acknowledgements. In this case the mobile node must nevertheless send the solicited acknowledgement packet ACK for example for the packet 3 although it may not have actually received any packets (because they got lost during the transmission from the gateway GW to the mobile node MN). Thus, the mobile node MN is charged for packets it has not received. Again, this prevents misbehavior of the mobile node MN. If the mobile node MN decides not to send the acknowledgement package ACK3 or if the acknowledgement request packet SOL_ACK3 does not reach the second terminal node MN, this results in a transmission stop as shown in FIG. 12. If in FIG. 12 the timer expires, GW will stop the transmission as it assumes that either the route to MN is interrupted or MN does not want to receive any packets anymore.

Therefore, in accordance with another embodiment of the invention, as shown in FIG. 13, the timer times out in step S131' after counting the time duration $\Delta T$ after transmitting the transmission packet IP3 in step S131. In this respect step S131 and S131' in FIG. 13 are identical to steps S113 and step S113' in FIG. 11. In step S132 a route check unit RC detects whether a transmission route to said second terminal node MN exists. If after the timer T times out in step S131' the route check unit RC detects in step S132 that a transmission route like MR or AR exists to the second terminal node MN, the acknowledgement request unit SOL will transmit to the terminal node MN the acknowledgement request packet SOL_ACK3. In FIG. 13, if the route check unit in step S132 determines that a route exists, steps S133', S133, S134, S135, S136 correspond to the steps S114', S114, S115, S116 and S117, respectively of FIG. 11.

Figure 14:
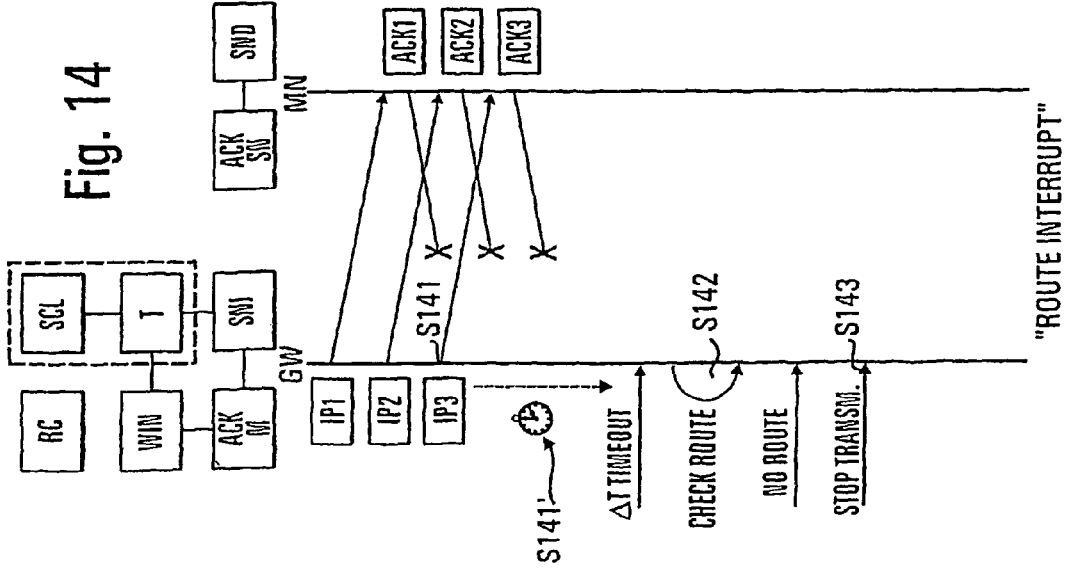
FIG. 14 shows the stoppage of the transmission in connection with a timer T and an interrupted route, in accordance with another embodiment of the invention.

If the route check in step S132 or S142 in FIG. 14 is negative, i.e. the route check unit RC detects that no transmission route is available to the second terminal node MN, the transmission/reception unit TRG of the gateway GW stops transmission in step S143. In FIG. 14 step S141, S141' and step S142 correspond to the steps S131, S131', S132.

It should be noted that in FIG. 13 and in FIG. 14 the route check unit RC shown in FIG. 6 detects whether a transmission route to the second terminal node MN exists by accessing standard routing protocols.

It should also be noted that in FIG. 13 and FIG. 14 there is a possible problem in that the second terminal node MN has no incentive to acknowledge the last packets of a session. Or even worse, it may systematically use repeated, short sessions instead of long ones. However, it is assumed that this misuse is not attractive to the user of the second terminal node MN because the session set-up creates some delay and overhead. Furthermore, a fixed fee for each session set-up may be charged.

Figure 15:
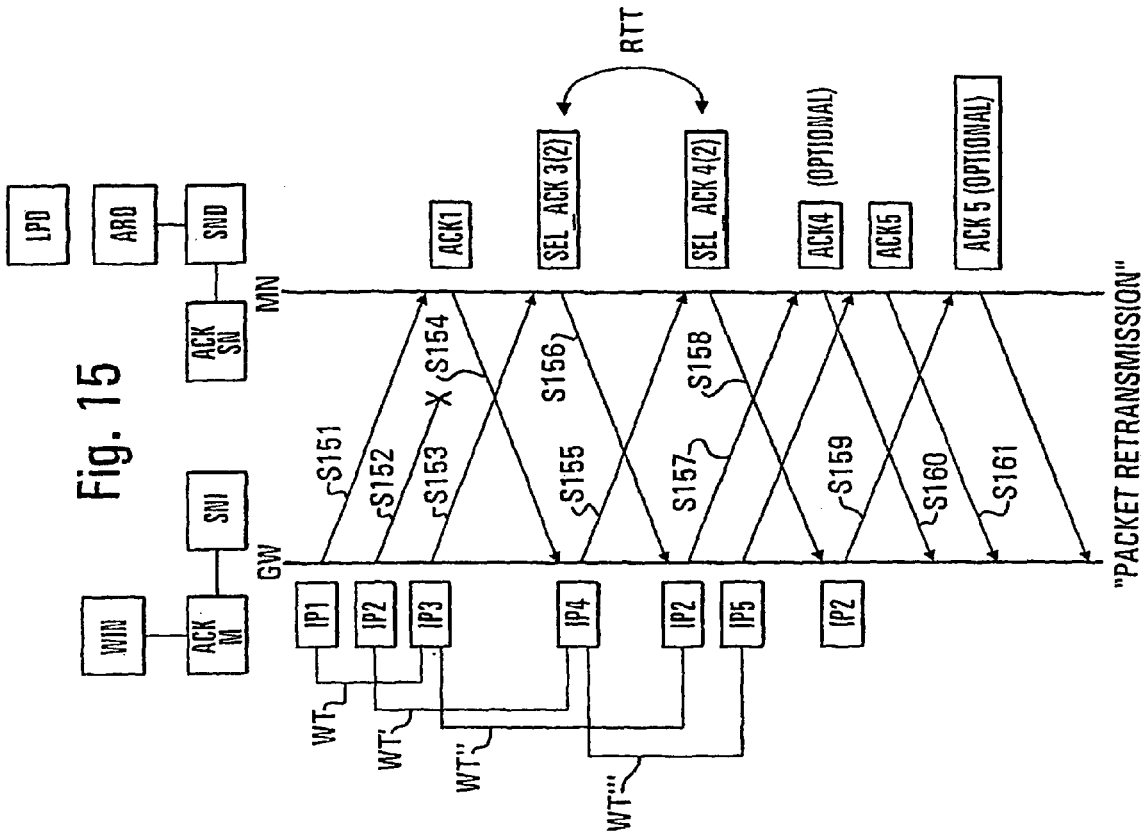
FIG. 15 shows a message flow when the second terminal node MN actively requests the retransmission of a transmission packet from the gateway GW, in accordance with another embodiment of the invention.

With reference to FIG. 9 it was already described above that also the second terminal node MN may detect that a transmission packet should have been transmitted and was not received. This can for example be done by checking the sequence of sequence numbers extracted from the received packets. In such a case (as shown in FIG. 15), the second terminal node MN may request a retransmission of a packet of which it believes that it should have been received. In the embodiment in FIG. 15 the first transmission window WT comprises the sending of transmission packets IP1, IP2, IP3 in steps S151, S152, S153. In step S154 the first transmission packet IP1 is acknowledged by sending an acknowledgement packet ACK1 from the second terminal node MN to the gateway GW. The receipt of the acknowledgement packet ACK1 triggers the sliding of the window WT to WT' and thus the sending of the next transmission packet IP4 in this next transmission window WT' (as explained above the receipt of any acknowledge message for a transmission packet contained in the transmission window WT causes the sliding of the window WT to WT', WT" or WT'" and thus the sending of further not already transmitted packets in the respective new transmission window WT', WT", WT'").

After receiving the third transmission packet IP3 in step S153, the lost packet detector LPD on the second terminal side MN is in a position to detect that the transmission packet IP2 should have been sent but was lost on its way (indicated with the "x" in the message flow in step S152). That is, since the second terminal node MN knows that in the transmission window WT three packets IP1, IP2, IP3 should have been sent but it has received only packets with sequence numbers 1, 3, it concludes that the second transmission packet IP2 was lost. Therefore, in step S156 a packet retransmission request unit ARQ in the second terminal node transmits to the gateway GW the retransmission request packet SEL_ACK3 (2). The retransmission request SEL_ACK3 (2) includes the sequence number 3 of the packet whose receipt should be acknowledged as well as a sequence number 2 of a transmission packet which is requested to be retransmitted from said gateway GW. In step S157, in response to the retransmission request packet SEL_ACK3 (2) in step S156, the transmission reception unit TRG of the gateway GW transmits the requested packet IP2 again in step S157. However, when the packet IP4 is transmitted in step S155 the second terminal side MN still has not received the requested second transmission packet IP2 and therefore, in step S158, the packet retransmission request unit ARQ sends another retransmission request packet SEL_ACK4 (2). This retransmission request packet acknowledges the receipt of the fourth transmission packet IP4 and simultaneously requests the retransmission of the transmission packet with the sequence number 2. The request packet SEL_ACK4 (2) requests another retransmission of the second transmission packet IP2 because at this point in time the second transmission packet IP2 sent in step 3157 in response to the first retransmission request message SEL_ACK3 (2) has not as yet arrived at the second terminal node MN. However, since after step S157 the retransmission of the second packet IP2 is successful, the transmission of the next packet IP5—before receiving the renewed retransmission request in step S158—is confirmed with an acknowledgement packet ACK5. However, due to the time relationship in FIG. 15 the second packet IP2 will be sent again to the second terminal node MN in step S159 in response to the additional retransmission request SEL_ACK4 (2).

As may be seen from FIG. 15, if the lost packet detector LPD on the second terminal side MN detects the loss of a transmission packet such as IP2 (because it knows that the complete sequence 1-2-3 should have been received if a transmission window WT is used), then the packet retransmission request unit ARQ sends repeated retransmission requests SEL_ACK3 (2), SEL_ACK4 (2) with each receipt of a new transmission packet IP3, IP4 until after step S157 the requested transmission packet IP2 actually arrives at the second terminal node MN.

Since the last packet IP4 of the second transmission window WT' could not be acknowledged—because the retransmission request SEL_ACK4 (2) had to be sent because the second transmission packet IP2 still had not arrived, the acknowledgement packet ACK4 for the last transmission packet IP4 of the second transmission window WT' is only sent after step S157_in step S160. Therefore, acknowledgement packets like ACK4 for other transmitted packets are only sent after an earlier lost transmission packet like IP2 is actually sent by the transmission/reception unit TRG of the gateway GW. This is possible because preferably the embodiment in FIG. 15 operates on a kind of "handshake" principle, i.e. the second terminal node MN will only answer with any kind of message after it has received a further transmission packet from the gateway GW.

On the other hand, the separate transmission of ACK4 in step 160 in FIG. 15 is optional because the retransmission request SEL_ACK4 (2) not only contains the request for a retransmission of packet IP2 but also an acknowledgment ACK4 for the packet IP4.

If packets get lost the receiving node can notice this by checking the sequence numbers of the received packets. The receiving node MN is charged for all packets including lost ones. However, the second terminal node MN may request the retransmission of a lost packet. In this case the second terminal node MN sends the selective acknowledgement SEL_ACK3 (2), SEL_ACK4 (2) in which it indicates the sequence number of the packet it has not received. The gateway GW or respectively its accounting unit ACC' will not charge packets which have been retransmitted. In the example in FIG. 15 the second terminal node MN sends selective acknowledgement packets SEL_ACKs for each received packet which does not have the sequence number 2. As explained, this leads to two retransmissions of the packet IP2 in steps S157, S159. This can be avoided if the second terminal node MN only sends selective acknowledgement packets SEL_ACK in certain intervals, e.g. corresponding to the roundtrip time RTT. That is, if the retransmission unit ARQ in the second terminal node MN would at least wait the roundtrip time RTT, as indicated with RTT in FIG. 15, then it can be achieved that the desired second transmission packet IP2 arrives and thus the second terminal node MN has no need to again request the retransmission of the packet IP2.

In FIG. 15 it is assumed that packets do not overtake each other during the transmission within a transmission window WT. That is, if no packets get lost, transmission packets IP1, IP2, IP3 will also arrive in the order 1-2-3 at the second terminal node MN. However, due to different delays or possibly different transmission routes for individual packets, it might occur that the receipt sequence is not 1-2-3 but 1-3-2. If the lost packet detector LPD on the second terminal side MN in such a case immediately sends a selective acknowledgement retransmission for the packet with the sequence number 2, it might do so too early because actually the second transmission packet IP2 might arrive, only just a little bit later. In this case the second terminal node MN should wait with sending a retransmission request SEL_ACK to see whether the assumed "packet loss" actually was a disorder of packets. Since the packet retransmission is performed "transmission window-wise" it is wise if the retransmission unit ARQ waits at least the roundtrip time RTT plus the sending out time (i.e. size of packet/transmission rate; e.g. 1 Mbit/1 Mbit/s=1 second) multiplied with the number of packets to be transmitted within each transmission window WT. The reason for this is that in the worst case the packets can arrive in such a disordered manner as 3-1-2. In this case the packet IP3 was the last sent packet but was actually the first received packet. Since the actually first sent packet was the transmission packet IP1 with the sequence number 1, in the worst case the transmission packet IP1 might still arrive as the last received packet at the second terminal node MN, for example in a sequence order of 3-2-1. Thus, it can be avoided that there is an unnecessary request for retransmission from the second terminal node MN.

Acknowledgement Tunneling Links

FIG. 5a shows the communication system SYS in accordance with the invention, including a first network IN with at least a first terminal node CN, an ad hoc network AHN with at least a second terminal node RN1-RN4, MN, and a gateway GW for forwarding transmission information TI between said first terminal node CN of said first network and said second terminal node of said ad hoc network AHN. As shown in FIG. 5a (and as also described above with reference to FIG. 3a), inside the mobile ad hoc network AHN communication connections such as wireless LAN and WAN connections or Bluetooth Connections, are used in order to route the transmission information from the gateway GW to the second terminal MN and to route the acknowledgement information from the second terminal node MN to the gateway GW along a transmission route MR, AR. It should be understood that the embodiments and examples of the invention shown in FIGS. 5a, 5b, 5c, and in FIGS. 6-15, may be carried out by using such wireless connections along the main route MR and the alternative route AR. However, as hereinafter explained with reference to FIGS. 16a, 16b particularly advantageous is if the gateway GW establishes an IP tunnel to the receiving mobile node MN, i.e. IP packets such as IP1-IP5 in FIG. 7, are encapsulated in IP packets. In this case, the mobile node MN has to send an acknowledgement to the gateway GW for each encapsulated packet it receives. Nodes are charged and compensated for a packet as soon as the respective acknowledgement has reached the gateway GW.

Figure 16A:
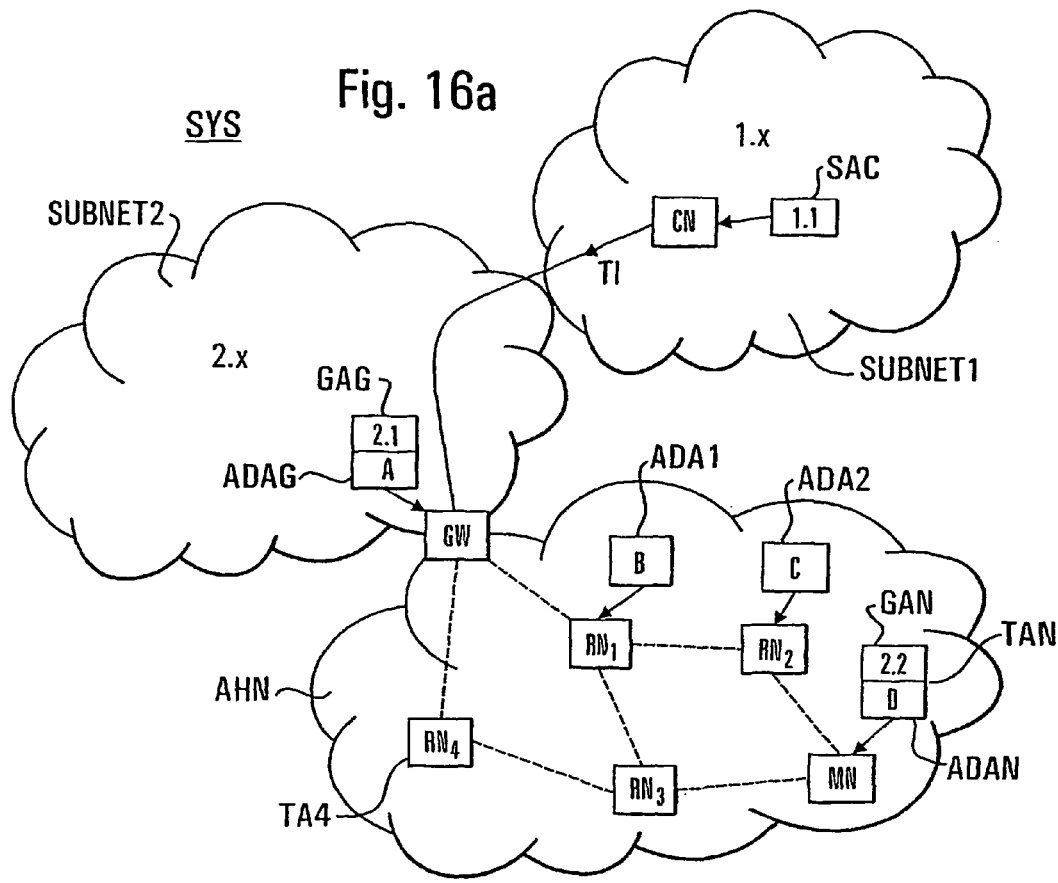
FIG. 16a shows the usage of global addresses and ad hoc addresses.

FIG. 16a shows the communication system SYS in accordance with the invention, in particular with respect to the usage of global addresses SAC, GAG, GAN and local ad hoc addresses ADAG, ADA1, ADA2, ADAN. It should be noted that the tunnel TUN1 to be described hereinafter with reference to FIG. 16b only performs a flow control, for example for the accounting purpose, but not for congestion control. Furthermore, the tunnel mechanism may retransmit packets only on demand. However, as also shown in FIG. 17, on top of the IP tunnel TUN1, any transport protocol such as TCP (Transport Control Protocol) or UDP (User Datagram Protocol) can be run. It should be noted that such a tunnel may be required also due to other reasons, e.g. if different addressing schemes are used. In this case, the tunnel can be reused for accounting purposes as well. If a micro-mobility protocol is employed that takes the existence of a mobility anchor point, the IP tunnel can alternatively be established between the mobility anchor point and the mobile node. That is, it should be noted that it is not only possible to set up the tunnel(s) between the gateway GW and the second terminal node MN but also between any other node of the operator-controlled network IN and the second terminal node MN. Such another node may be the aforementioned mobility anchor point or any other terminal, switching point, base station, access point etc. Therefore, it should be noted that the exchange of transmission and acknowledgment packets and the accounting as described above to exist between the gateway GW and the second terminal node MN may likewise take place between any other node of the network IN and the second terminal node MN.

FIG. 16a shows an example of addressing and routing in the Internet. Hosts are identified by complete IP addresses whereas sub-networks are identified by prefixes. Hosts always have the same prefix as their subnet. In the scenario of FIG. 16a the corresponding node CN is located in a subnet SUBNET1 with a prefix 1. Therefore, the source address or global source address SAC is 1.1. Likewise, the gateway GW belongs to the subnet SUBNET2 with prefix 2 and has the global address GAG 2.1. Hereinafter, a global address of a unit or host inside the subnets SUBNETS1, SUBNET2 should be understood as a fixed address belonging to a fixed location.

Despite the fact that an intrinsic property of the ad hoc network AHN is the feature that the respective nodes RN1-N4, MN are mobile nodes, the mobile nodes may also have assigned to it a global address, for example for the mobile node MN the global address GAN=2.2. This global address GAN is known to the corresponding node CN as target address TAN but MN also contains an ad hoc address ADAN. Only the GW knows both addresses. Likewise, the target address TA4 of the node RN4 will have a global address as well as an ad hoc address.

In ad hoc networks, addressing and routing is flat and mobile devices can use arbitrary addresses, for example the ad hoc addresses ADAG=A for the gateway GW and ADA1=B, ADA2=C and ADAN=D for the mobile nodes RN1, RN2 and MN, respectively. Thus, the actual target address TAN of the second terminal node MN consists of a global address GAN=2.2 known to the corresponding node CN and a local or ad hoc address ADAN=D only known to the gateway GW. If the mobile node MN connects to the Internet and wants to be reachable by external corresponding nodes CN, it must have this global address GAN as well because the corresponding node CN, when sending the transmission information TI cannot know which temporary ad hoc address the mobile node MN has at any one time. For this reason the mobile node MN has set global address GAN=2.2. The mobile node MN uses the same prefix "2" as the subnet SUBNET2 to which it is attached. Hence, the mobile node MN uses the global address GAN=2.2 additionally to its ad hoc address ADAN=D, as shown in FIG. 16a. As also explained before, the gateway GW essentially belongs to both networks SUBNET1, SUBNET2 and it must therefore also have a global address GAG=2.1 to be reachable by the corresponding node CN as well as an ad hoc address ADAG=A in order to route information to the second terminal node MN and to receive information therefrom. Thus, also the gateway GW maintains the two types of addresses.

Figure 16B:
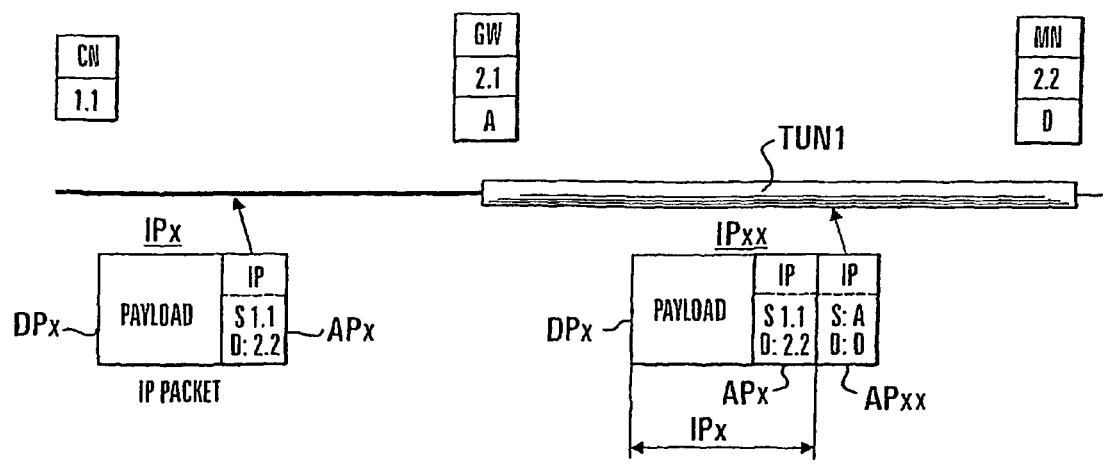
FIG. 16b shows the encapsulation of a transmission packet IPx from the first terminal node CN into a modified transmission packet IPxx on the first tunnel TUN1.

If the mobile node MN wants to communicate with the Internet, packets must be tunneled within the ad hoc network, as illustrated in FIG. 16b.

As shown in FIG. 6, the transmission/reception unit TRG comprises a first tunnel set-up unit IPTUN for setting up a first tunnel link TUN1 between the gateway GW and said second terminal node MN. The transmission/reception unit TRG transmits the transmission information TI and receives said acknowledgement information, e.g. ACTAN, ACTAN', ACTAN" in FIG. 5c, to and from the second terminal node MN respectively through said first tunnel link.

The first tunnel link TUN1 acts as a kind of "rigid link" which is directly set up between the gateway GW and the second terminal node MN whose transmission/reception unit TRG respectively comprises the aforementioned first tunnel set-up unit IPTUN, as shown in FIG. 6. The main advantage of using a tunnel connection between the mobile node MN and the gateway is that there can be no disturbance of the transmission information and acknowledgement information transmission and a dedicated connection is provided solely to perform the flow control, for example the accounting of packets inside the ad hoc network. It should be noted that in principle the tunnel TUN1 is used for flow control and accounting but not for congestion control. It may also be noted that the tunnel TUN1 between the mobile node MN and the gateway GW might be required also due to other reasons, e.g. if different addressing schemes are used. In this case, the tunnel can be reused for accounting purposes as well.

Preferably, and as also shown in FIG. 16b, the first tunnel set-up unit IPTUN sets up said first tunnel link TUN1 by encapsulating transmission packets IPx into modified transmission packets IPxx generated and transmitted by said transmission/reception unit TRG. That is, in accordance with the invention IP packets (transmission packets and acknowledgement packets) are encapsulated in IP packets on the tunnel TUN1.

As shown in FIG. 16b the transmission information TI can be an IP packet IPx having a payload data section DPx and an addressing portion APx. The IP transmission packet IPx comprises in the addressing portion APx the global source and destination addresses S:1.1 and D:2.2 indicating globally the origin and the destination for the transmission packet IPx. Thus, the corresponding node CN sends out an IP transmission packet with a global destination address 2.2. This packet is routed to the gateway GW where an address encapsulation must take place into a new packet IPxx consisting of the IP packet IPx (with data portion DPx and addressing portion APx) however with a new addressing portion APxx used for the routing and tunneling of the IP packet IPx in the ad hoc network AHN.

In the addressing portion APxx of the IP packet IPxx an encapsulation of the addresses takes place. Thus, the first tunnel set-up unit IPTUN is adapted to respectively encapsulate a transmission packet IPx received from said first terminal node CN and having a global source address S:1.1 of said first terminal node CN and a global destination address D:2.2 of the second terminal node MN into a modified transmission packet IPxx which has in its addressing portion an ad hoc source address S:A of said gateway GW and an ad hoc destination address D:D of said second terminal node MN. That is, the IP packet IPx is fully encapsulated in a modified IP packet IPxx with a new header APxx which is used for the routing in the ad hoc network. Thus, the modified transmission packet IPxx is routed from the local ad hoc address A to the local destination address D.

Thus, when the first packet IPx having a destination address of the gateway D:2.2 arrives at the gateway GW, the gateway GW is considered the new source for forwarding transmission information inside the ad hoc network AHN. Therefore, the earlier global destination address D:2.2 is changed into the new source address S:A in the ad hoc network. The global destination address D:2.2 of the second terminal node MN is changed into the local ad hoc network address D:D. Thus, within the ad hoc network AHN the modified transmission packet IPxx is routed from the source GW (S:A) to the destination MN (D:D) using the local ad hoc addresses only. Thus, the gateway GW encapsulates the transmission packet IPx into another IP packet IPxx with a destination address A and tunnels it to the mobile node MN. Of course, on the mobile node side MN the packet IPxx is de-capsulated in order to retrieve the information about where the packet originally came from (source address S:1.1) and to retrieve the payload data from the data portion DPx.

Since a "virtual" or "logical" tunnel TUN1 is set-up between the gateway GW and the second terminal node MN, the exchange of the transmission packets and acknowledgement packets between the two nodes GW, MN is carried out completely undisturbed from any other transmission of packets inside the ad hoc network. Thus, the tunnel TUN1 acts as a kind of rigid connection only specially dedicated to the exchange of transmission and acknowledgement packets, which is for example useful for the accurate accounting, as explained above. The usage of the first tunnel is also advantageous in cases where the corresponding node and the ad hoc terminals do not have the same format of addresses. Another advantage of the tunnel set-up is that the packet from the corresponding node remains intact, i.e. its format is not changed in the gateway when it is transmitted through the tunnel to the second terminal node.

FIG. 17 shows another embodiment of the invention where a specific reliable tunneling protocol can be used on top of the first tunneling protocol TUN1. One possibility is to set up a TCP tunnel additionally to the IP tunnel TUN1 between the gateway GW and the mobile node MN. The TCP protocol can be a light version that does not perform retransmits and that does not use an congestion control algorithms. This approach is illustrated in FIG. 17 where a second tunnel TUN2 is encapsulated in the first tunnel TUN1.

As indicated in FIG. 6, to set up the second tunnel TUN2, the gateway GW and the mobile node MN respectively comprise a second tunnel set-up unit TCPTUN for setting up the second tunnel link TUN2 encapsulated within said first tunnel link TUN1 between said gateway GW and the second terminal node MN. The transmission/reception unit TRG transmits the transmission information TI and receives acknowledgement information, such as ACTAN, ACTAN', ACTAN" in FIG. 5c, to and from the second terminal node MN respectively, by using said second tunnel link TUN2 encapsulated within said first tunnel link TUN1, as schematically indicated in FIG. 17 where the second tunnel is surrounded or encapsulated by the first tunnel link TUN1. "Using" the second tunnel link TUN2, in this context, means that the protocol of said second tunnel link TUN2 is used.

As shown in FIG. 17, the second tunnel set-up unit TCP-TUN sets up the second tunnel link TUN2 by encapsulating the transmission packets IPx having the data portion DPx and the addressing portion APx similar as in FIG. 16b and being received from the first terminal node CN into modified transmission packets IPx' including the packet IPx having the data portion DPx and the addressing portion APx and a new header or addressing portion APx' which for the example in FIG. 17 is assumed to be a TCP header with a TCP source and destination address. Thus, the received IP packets APx are embedded in a second tunneling protocol such as TCP.

The encapsulated or modified TCP transmission packets IPx' including the IP packet IPx with the data portion DPx and the addressing portion APx and the new header APx' are then encapsulated by the first tunnel set-up unit IPTUN into modified transmission packets IPxx' including the TCP packet IPx' and an addressing portion APxx' similar to APxx in the modified transmission packet IPxx in FIG. 16b. Thus, the TCP packet IPx' (including the encapsulated IP packet IPx) is once more encapsulated into a modified transmission packet IPxx' by the first tunnel set-up unit, similarly as in FIG. 16b, only that the packets which are encapsulated by the first tunnel set-up unit IPTUN are the TCP packets IPx' which have already been encapsulated using the second tunneling protocol.

As explained above, the first tunnel TUN1 might already be set up for other reasons, e.g. if different addressing schemes are used. In this case, the already set-up tunnel can also be used for the exchange of transmission information and acknowledgement information and for the accounting as described above.

Preferably, the first tunnel set-up unit IPTUN sets up as said first tunnel link TUN1 an IP (Internet protocol) protocol. Preferably, the second tunnel set-up unit TCPTUN sets up as second tunnel TUN2 a TCP (Transport Control Protocol) protocol, or a stack of a L2TP (Layer-2-Tunneling protocol) protocol, a PPP (Point-to-Point Protocol) protocol and a UDP (User Datagram Protocol) protocol. The second tunnel may typically be set up by using any protocol which normally does not allow the exchange of acknowledgment information and transmission information whilst the first tunnel may be set up using any IP protocol version.

With the usage of the tunnel (either one tunnel or two tunnels) an enhanced flow control of packets is possible in order to ensure that nodes properly acknowledge packets.

Finally, FIG. 18 shows another embodiment of the invention in which the first tunnel TUN1 is formed by an IP tunnel between the gateway GW and the mobile node MN and the second tunnel TUN2 is formed by a stack of a UDP (User Datagram Protocol) protocol, a L2TP (Layer-2-Tunneling protocol) protocol and a PPP (Point-to-Point) protocol. The PPP protocol is set up over the L2TP and the UDP protocol.

Industrial Applicability

As described above, in accordance with the invention it is possible to perform a more accurate flow control of packets in an ad hoc network AHN because each transmission packet is acknowledged with an acknowledgement packet. This can be used advantageously not only for a general more accurate flow control but also for a more accurate accounting. That is, in accordance with the invention a packet transmission monitoring for an accurate accounting in ad hoc networks is achieved preferably by establishing an IP tunnel between the gateway (or a mobility anchor point or in fact any other node in the operator-controlled network IN) and the receiving node which is used for accounting and by performing an enhanced flow control of the packets sent through this IP tunnel in order to ensure that nodes properly acknowledge packets.

Although above the specific example of using a gateway GW is described it should be noted that any other node in the operator-controlled network IN could be used for carrying out the flow control and accounting functions of this invention. This other node may, however, be connected to the gateway through some connection in order to initiate the transfer of received transmission information TI from the gateway GW to the second terminal node MN).

Above also specific examples of window sizes of 3 packets were described, however, the invention is of course not restricted to this window size. Any other window size may be used depending on the specific application.

Furthermore, specific protocols were described as examples for the first and second tunnel. However, any other suitable protocol may be used depending on the specific application. Especially the first tunnel may be tunnel which may be set up and already exists for other reasons, as explained above.

The invention can be used in any kind of communication system SYS comprising a first network and a second network wherein said second network is an ad hoc network which is spontaneously or "ad hoc" formed as was explained above.

It should be noted that the invention comprises other embodiments and combinations which are not listed specifically above. For example, further embodiments may result from a combination of individual features and steps which have been separately described in the specification and the claims.

For example, another embodiment of the invention may comprise a computer program product, comprising code sections for respectively carrying out the functions of the respective units of the gateway GW in accordance with one or more of the above embodiments and examples.

Another embodiment of the invention may comprise a computer program product, comprising code sections for respectively carrying out the functions of the respective units of the second terminal node MN in accordance with one or more of the above embodiments and examples.

Finally, yet another embodiment of the invention may comprise a computer program product, comprising code sections for respectively carrying out the method steps of respective units of the gateway and/or the second terminal node, in accordance with one or more of the above embodiments and examples.

Furthermore, it should be noted that what was described above only designates the best mode of the invention as currently known to the inventors and the invention can comprise other embodiments as well. Furthermore, other modifications and variations of the invention are covered by the attached claims.

Reference numerals in the claims serve clarification purposes and do not limit the scope of these claims.

The invention claimed is:

1. A gateway for forwarding transmission information between a first terminal node of a first network and a second terminal node of an ad hoc network, wherein the first terminal node is addressed by a global source address and the second terminal node is addressed by an ad hoc destination address, the gateway comprising:
a transmission/reception unit adapted to receive transmission information from said first terminal node and to transmit said transmission information to said second terminal node; and
an acknowledgment information detection unit adapted to detect the receipt of acknowledgment information from said second terminal node acknowledging that said second terminal node has received said transmission information;
wherein said transmission/reception unit comprises a first tunnel setup unit for setting up a first tunnel link between said gateway and said second terminal node by encapsulating a transmission packet received from said first terminal node and having a global source address of said first terminal node and a global destination address of said second terminal node into a modified transmission packet having an ad hoc source address of said gateway and an ad hoc destination address of said second terminal node, wherein said transmission/reception unit transmits said transmission information and receives said acknowledgment information to and from said second terminal node respectively through said first tunnel link.

2. The gateway according to claim 1, characterized by an accounting unit adapted to determine charging information for the transmission of said transmission information to said second terminal node if said acknowledgment information detection unit detects the receipt of acknowledgment information for the transmission of said transmission information to said second terminal node.

3. The gateway according to claim 1, characterized by a transmission information characteristics determining unit adapted to determine transmission characteristics of the transmission of said transmission information to said second terminal node.

4. The gateway according to claim 1, characterized in that said transmission information characteristics determining unit is adapted to determine as said transmission characteristics one or more selected from the group consisting of a data amount, a transmission speed, a transmission route along which said transmission information has been transmitted to said second terminal node, and a delay time of the packet transmission.

5. The gateway according to claim 1, characterized in that said second ad hoc network is a packet switched network, said transmission information comprises one or more transmission packets, and said acknowledgement information comprises one or more acknowledgment packets.

6. The gateway according to claim 5, characterized by an acknowledgment request unit adapted to transmit to said second terminal node an acknowledgment request packet including a predetermined sequence number of a transmission packet which was transmitted but for which no acknowledgement information has as yet been detected by said acknowledgment information detection unit, said acknowledgment request message requesting from said second terminal node the transmission of an acknowledgment packet acknowledging the receipt of the transmission packet having said predetermined sequence number.

7. The gateway according to claim 1, characterized by a route check unit adapted to detect whether a transmission route to said second terminal node exists.

8. A first terminal node of an ad hoc network for exchanging transmission information with a second terminal node of another network connected to said ad hoc network through a gateway, wherein the first terminal node is addressable by an ad hoc destination address and the second terminal node is addressable by a global resource address, the first terminal node comprising:
a transmission/reception unit adapted to receive transmission information from said another terminal node through said gateway; and
an acknowledgment information transmission unit adapted to transmit to said gateway acknowledgment information acknowledging that said transmission/reception unit has received said transmission information; wherein
said transmission/reception unit comprise a first tunnel setup unit for setting up a first tunnel link between said second terminal node and said gateway by encapsulating a transmission packet received from said first terminal node and having a global source address of said first terminal node and a global destination address of said second terminal node into a modified transmission packet having an ad hoc source address of said gateway and an ad hoc destination address of said second terminal node, wherein said transmission/reception unit receives said transmission information and transmits said acknowledgment information from and to said gateway respectively through said first tunnel link.

9. The first terminal node according to claim 8, characterized in that said ad hoc network is a packet switched network, said transmission information comprises one or more transmission packets, and said acknowledgement information comprises one or more acknowledgment packets.

10. The first terminal node according to claim 8, characterized by a packet retransmission request unit adapted to transmit to said gateway a retransmission request packet including a sequence number of a transmission packet which is requested to be retransmitted from said gateway.

11. A method for forwarding transmission information between a first terminal node of a first network of a communication system and a second terminal node of an ad hoc network of said communication system, wherein the first terminal node is addressable by a global source address and the second terminal node is addressable by an ad hoc destination address, the method comprising the following steps in a gateway of said communication system:
    setting up a first tunnel link in the ad hoc network between said gateway and said second terminal node by encapsulating a transmission packet received from said first terminal node and having a global source address of said first terminal node and a global destination address of said second terminal node into a modified transmission packet having an ad hoc source address of said gateway and an ad hoc destination address of said second terminal node and further transmitting said transmission information and receiving said acknowledgment information to and from said second terminal node respectively through said first tunnel link;
    receiving, in said gateway of said communication system, transmission information from said first terminal node and transmitting, from said gateway via the first tunnel link, said transmission information to said second terminal node; and
    detecting, in said gateway, the receipt of acknowledgment information via the first tunnel link from said second terminal node acknowledging that said second terminal node has received said transmission information.

12. A method for forwarding transmission information between a first terminal node of a first network of a communication system and a second terminal node of an ad hoc network of said communication system, wherein the first terminal node is addressable by a global source address and the second terminal node is addressable by an ad hoc destination address, the method comprising the following steps in said second terminal node:
    setting up a first tunnel link in the ad hoc network between said gateway and said second terminal node by encapsulating a transmission packet received from said first terminal node and having a global source address of said first terminal node and a global destination address of said second terminal node into a modified transmission packet having an ad hoc source address of said gateway and an ad hoc destination address of said second terminal node, and further transmitting said transmission information and receiving said acknowledgment information to and from said second terminal node respectively through said first tunnel link;
    receiving, in said second terminal node via the first tunnel link, transmission information from a gateway of said communication system; and
    transmitting, from said second terminal node via the first tunnel link to said gateway, acknowledgment information acknowledging that said second terminal node has received said transmission information.

13. The method according to claim 11, characterized by determining, in said gateway, charging information for the transmission of said transmission information to said second terminal node if the receipt of acknowledgment information for the transmission of said transmission information to said second terminal node is detected.

14. The method according to claim 11, characterized by determining transmission characteristics of the transmission of said transmission information to said second terminal node.

15. The method according to claim 11, characterized by determining as said transmission characteristics one or more selected from the group consisting of a data amount, a transmission speed, a transmission route along which said transmission information has been transmitted to said second terminal node, and a delay time of the packet transmission along the transmission route to the second terminal node.

16. The method according to claim 11, characterized by transmitting, from said gateway to said second terminal node, an acknowledgment request packet including a predetermined sequence number of a transmission packet which was transmitted but for which no acknowledgement information has as yet been detected in said gateway, said acknowledgment request message requesting from said second terminal node the transmission of an acknowledgment packet acknowledging the receipt of the transmission packet having said predetermined sequence number.

17. The method according to claim 11, characterized by setting up a first tunnel link between said gateway and said second terminal node and transmitting said transmission information and receiving said acknowledgment information to and from said second terminal node respectively through said first tunnel link.

18. The method according to claim 11, characterized in that said ad hoc network is a packet switched network, said transmission information comprises one or more transmission packets, and said acknowledgement information comprises one or more acknowledgment packets.

19. A computer program product stored on a computer-readable medium, comprising code sections for respectively carrying out the functions of the gateway in accordance with claim 11.

20. A computer program product stored on a computer-readable medium, comprising code sections for respectively carrying out the functions of the terminal node in accordance with claim 12.

* * * * *